(12) United States Patent
Imoto

(10) Patent No.: US 9,703,035 B2
(45) Date of Patent: Jul. 11, 2017

(54) OPTICAL CONNECTOR, METHOD FOR MANUFACTURING THE SAME, AND MOLD CONTAINER FOR MANUFACTURING THE SAME

(71) Applicant: KOHOKU KOGYO CO., LTD, Nagahima-shi, Shiga (JP)

(72) Inventor: Katsuyuki Imoto, Yonago (JP)

(73) Assignee: Kohoku Kogyo Co., Ltd., Shiga (JP)

( * ) Notice: Subject to any disclaimer, the term of this patent is extended or adjusted under 35 U.S.C. 154(b) by 151 days.

(21) Appl. No.: 14/461,743

(22) Filed: Aug. 18, 2014

(65) Prior Publication Data
US 2015/0055913 A1 Feb. 26, 2015

(30) Foreign Application Priority Data

Aug. 20, 2013 (JP) .................................. 2013-170279
Sep. 18, 2013 (JP) .................................. 2013-192911

(51) Int. Cl.
*G02B 6/02* (2006.01)
*G02B 6/38* (2006.01)
(Continued)

(52) U.S. Cl.
CPC ......... *G02B 6/02042* (2013.01); *G02B 6/368* (2013.01); *G02B 6/3801* (2013.01);
(Continued)

(58) Field of Classification Search
None
See application file for complete search history.

(56) References Cited

U.S. PATENT DOCUMENTS 4,880,494 A * 11/1989 Kaukeinen ............. G02B 6/245
216/24
4,923,275 A * 5/1990 Kaukeinen ................ B41J 2/46
385/115
(Continued)

FOREIGN PATENT DOCUMENTS

JP 2003-313041 A 11/2003
JP 2010-286548 A 12/2010
(Continued)

OTHER PUBLICATIONS

Examination Report Received for Japanese Patent Application No. 2013-192911, mailed on Dec. 10, 2013, 5 pages (2 pages of English Translation and 3 pages of Official Copy).
(Continued)

*Primary Examiner* — Jerry Rahll
(74) *Attorney, Agent, or Firm* — Morgan, Lewis & Bockius LLP

(57) ABSTRACT

An optical connector connects: N (N is an integer of 3 to 14) single-mode fibers each including one core with a high refractive index in a cladding material with a low refractive index; to multi-core fiber including N cores with high refractive indexes in a cladding material with low refractive index such that the cores of the single-mode fibers are respectively optically coupled to cores of the multi-core fiber. The optical connector includes: quartz glass cylinder having a first end face to be in contact with the multi-core fiber and a second end face to be in contact with single-mode fibers; N glass fibers that are arranged in the quartz glass cylinder to extend from the first to second end face, the N glass fibers each including: a circular rod with high refractive index that has a constant outer diameter; and a low refractive index material that surrounds an outer periphery of the circular rod and has a constant thickness.

6 Claims, 24 Drawing Sheets

(51) Int. Cl.
*G02B 6/36* (2006.01)
*G02B 6/40* (2006.01)
*C03B 19/00* (2006.01)
*C03B 19/06* (2006.01)
*C03B 23/047* (2006.01)

(52) U.S. Cl.
CPC ............... *G02B 6/40* (2013.01); *C03B 19/00* (2013.01); *C03B 19/066* (2013.01); *C03B 23/047* (2013.01); *G02B 6/3672* (2013.01); *G02B 6/3885* (2013.01)

(56) References Cited

U.S. PATENT DOCUMENTS

| | | | | |
|---|---|---|---|---|
| 5,228,105 | A * | 7/1993 | Glista | H04L 12/437 385/135 |
| 5,288,992 | A * | 2/1994 | Fohl | G02B 6/04 250/216 |
| 8,472,765 | B2 * | 6/2013 | Holland | G02B 6/262 385/129 |
| 8,554,032 | B2 * | 10/2013 | Koshinz | G02B 6/2808 385/147 |
| 8,693,088 | B2 * | 4/2014 | Fini | G02B 6/2835 359/334 |
| 9,069,118 | B2 * | 6/2015 | Matsuo | G02B 6/02042 |
| 9,435,943 | B1 * | 9/2016 | Takenaga | G02B 6/02019 |
| 9,557,483 | B2 * | 1/2017 | Kozak | G02B 6/04 |
| 2006/0257083 | A1 | 11/2006 | Rasmussen | |
| 2009/0154881 | A1 * | 6/2009 | Salokatve | G02B 6/2835 385/46 |
| 2010/0278486 | A1 * | 11/2010 | Holland | G02B 6/262 385/43 |
| 2011/0132038 | A1 | 6/2011 | Dawes et al. | |
| 2011/0279888 | A1 * | 11/2011 | Fini | G02B 6/2835 359/334 |
| 2011/0280517 | A1 * | 11/2011 | Fini | G02B 6/02042 385/43 |
| 2013/0148926 | A1 * | 6/2013 | Koshinz | G02B 6/2808 385/46 |
| 2013/0216184 | A1 * | 8/2013 | Kopp | G02B 6/30 385/43 |
| 2014/0010508 | A1 * | 1/2014 | Matsuo | G02B 6/02042 385/127 |
| 2014/0119694 | A1 * | 5/2014 | Abedin | G02B 6/02042 385/43 |
| 2015/0043871 | A1 * | 2/2015 | Mitose | G02B 6/3885 385/76 |
| 2015/0055913 | A1 * | 2/2015 | Imoto | C03B 19/00 385/24 |
| 2015/0139587 | A1 * | 5/2015 | Kozak | G02B 6/04 385/43 |
| 2016/0245992 | A1 * | 8/2016 | Takenaga | G02B 6/02019 |

FOREIGN PATENT DOCUMENTS

| | | |
|---|---|---|
| JP | 2010-286661 A | 12/2010 |
| JP | 2010-286718 A | 12/2010 |
| JP | 2011-018013 A | 1/2011 |
| WO | 2012/172906 A1 | 12/2012 |
| WO | 2013/051656 A1 | 4/2013 |

OTHER PUBLICATIONS

Examination Report Received for Japanese Patent Application No. 2013-192911, mailed on Mar. 11, 2014, 7 pages (3 pages of English Translation and 4 pages of Official Copy).

Extended Search Report Received for European Patent Application No. 14181349.3 mailed on Jan. 9, 2015, 9 pages.

* cited by examiner

Fig. 2A
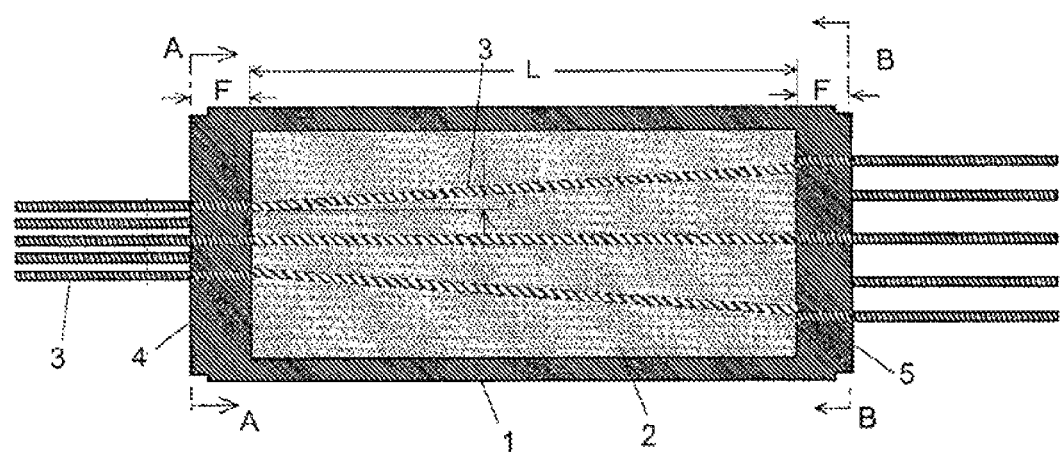
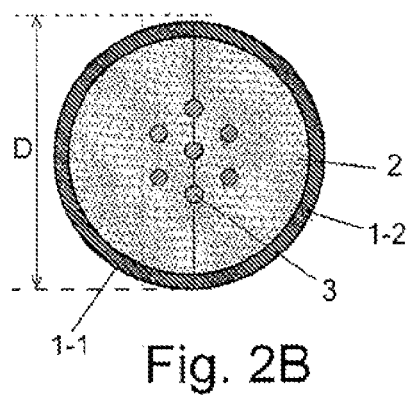
Fig. 2B
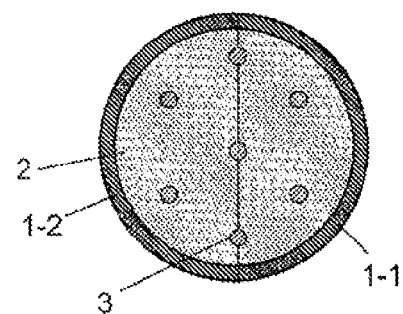
Fig. 2C

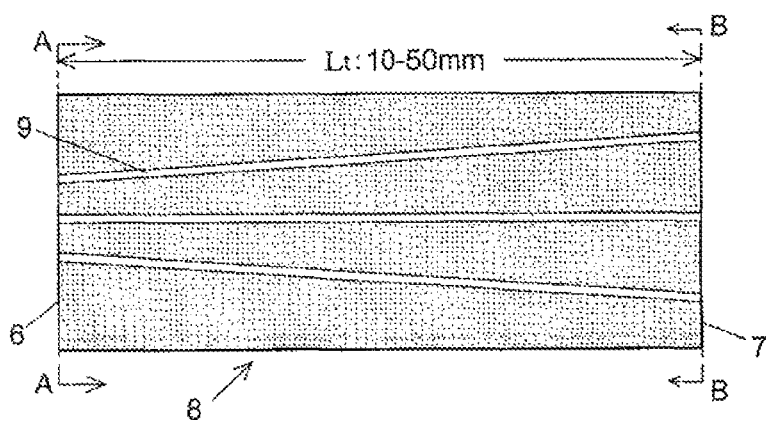
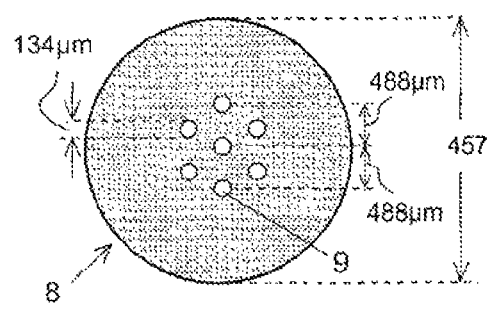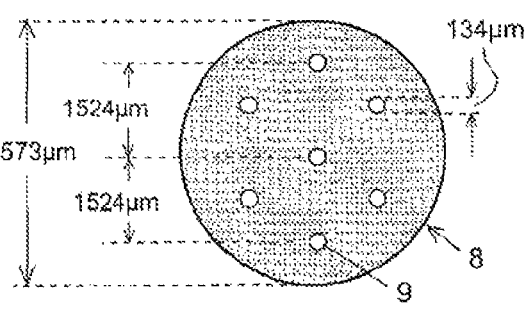
Fig. 3A
Fig. 3B
Fig. 3C

Fig. 7A
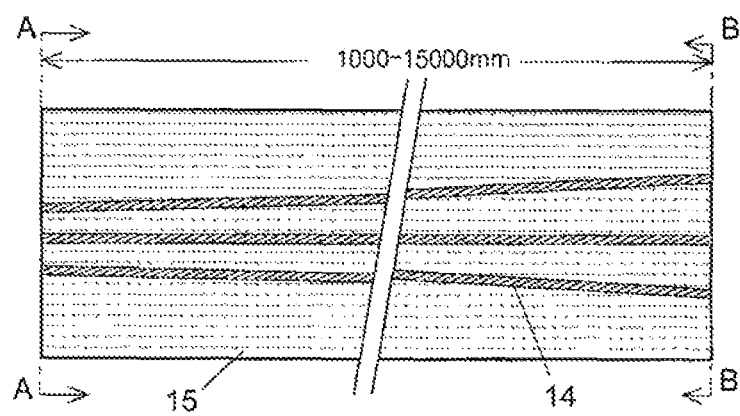
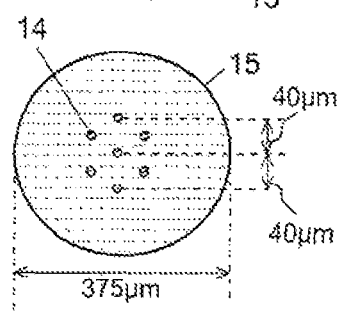
Fig. 7B
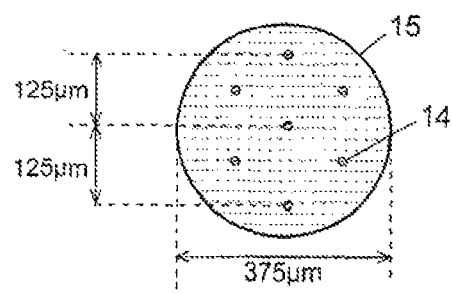
Fig. 7C

Fig. 8
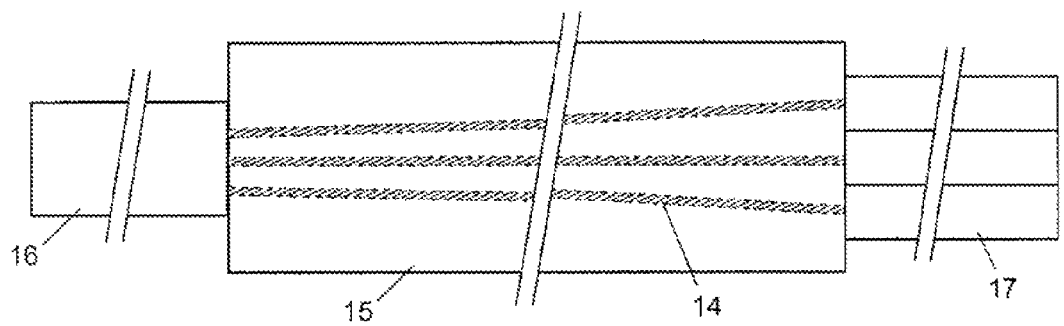
Fig. 9A
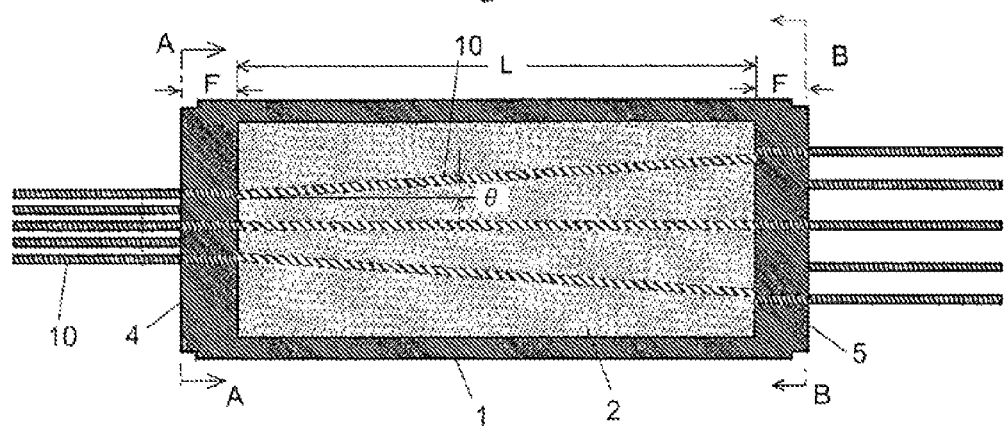
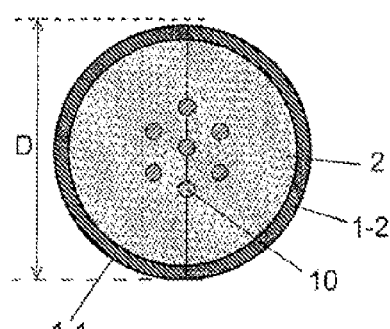
Fig. 9B
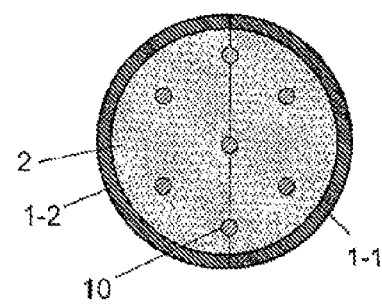
Fig. 9C

Fig. 10A
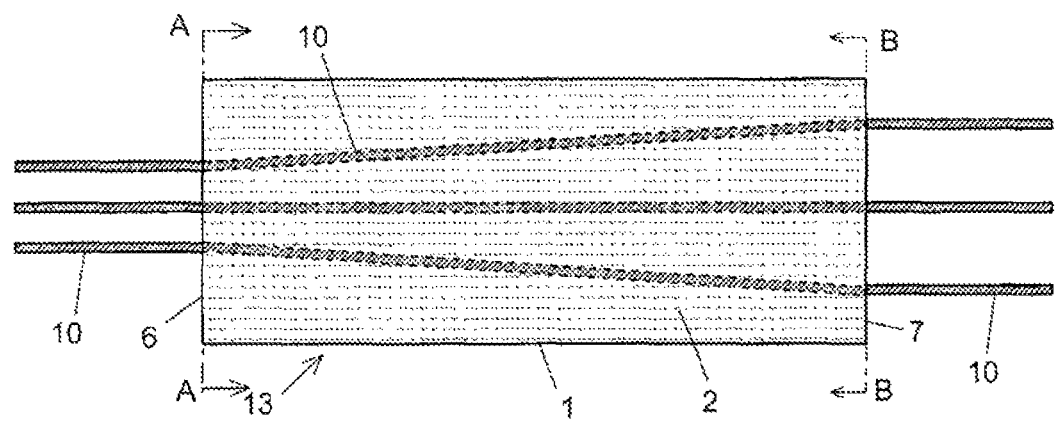
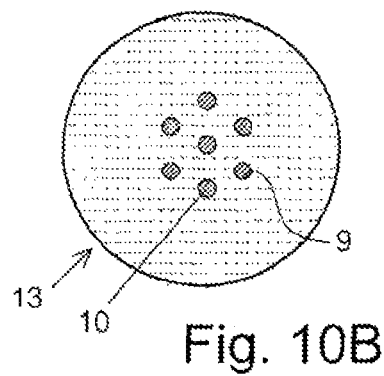
Fig. 10B
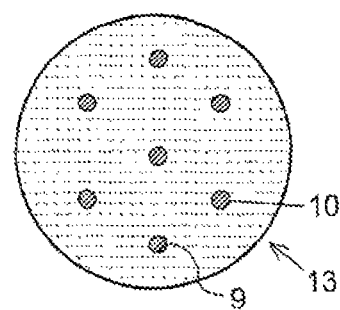
Fig. 10C
Fig. 11
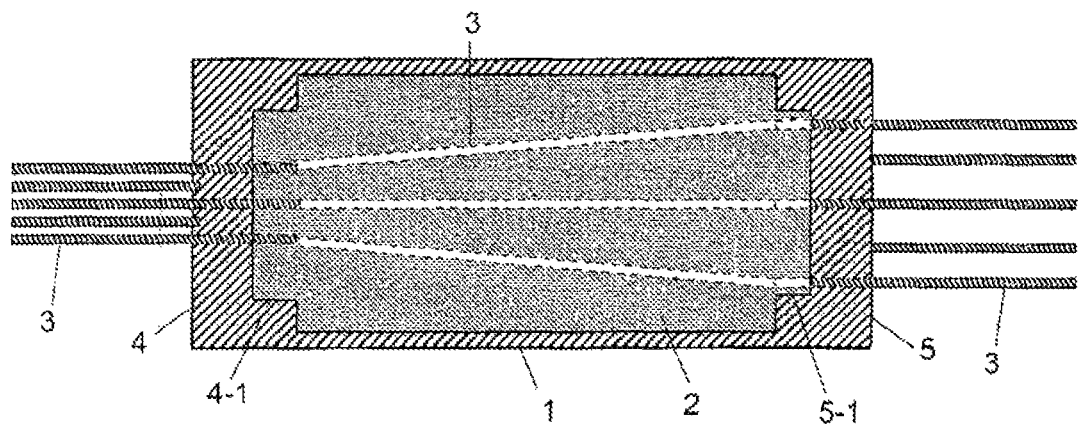

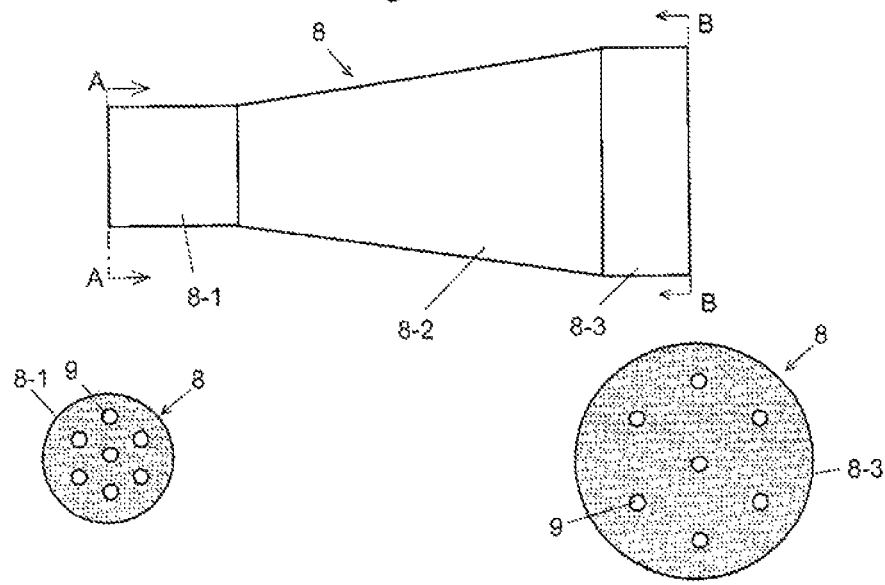
Fig. 12A
Fig. 12B
Fig. 12C
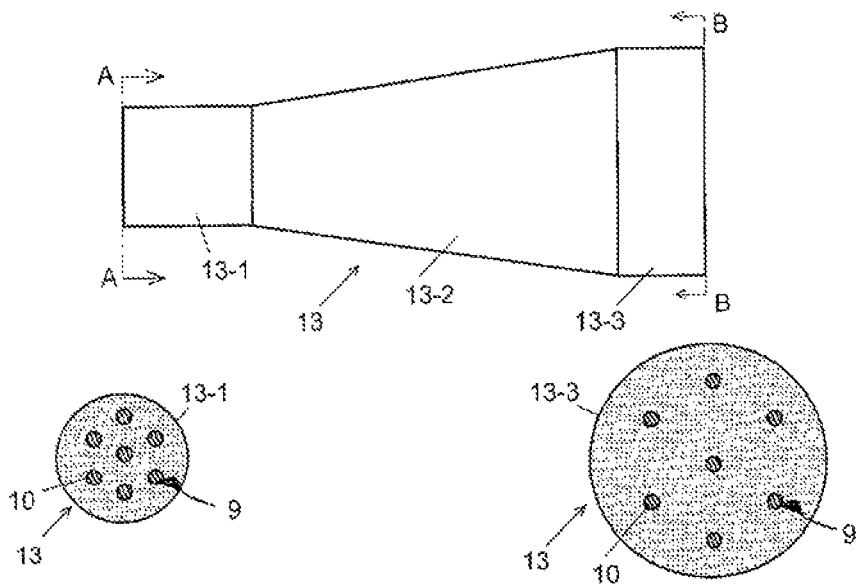
Fig. 13A
Fig. 13B
Fig. 13C

Fig. 15A
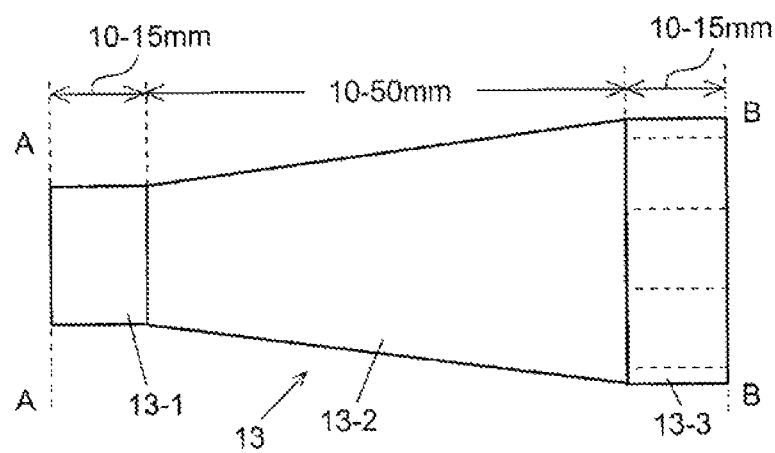
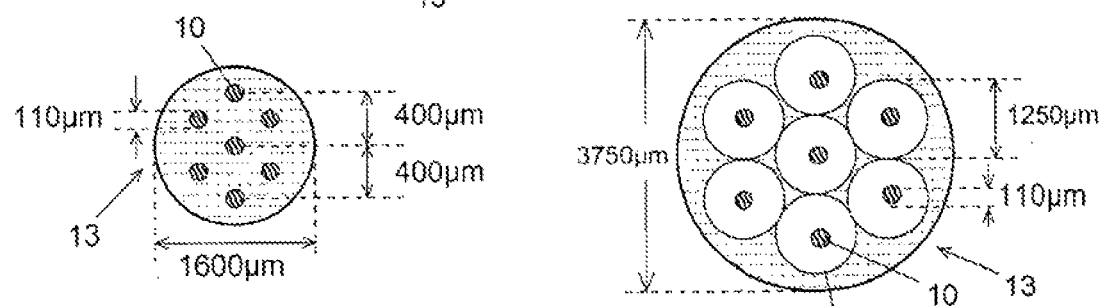
Fig. 15B
Fig. 15C

Fig. 16A
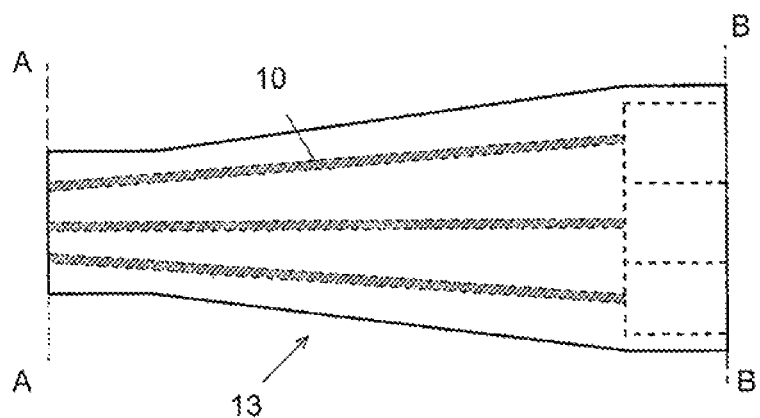
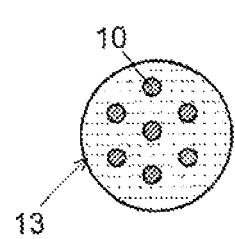
Fig. 16B
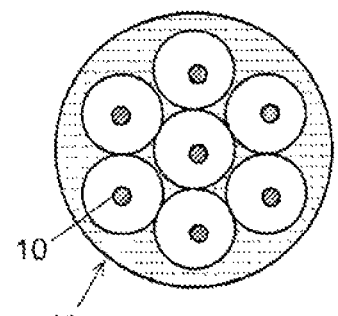
Fig. 16C

Fig. 17A
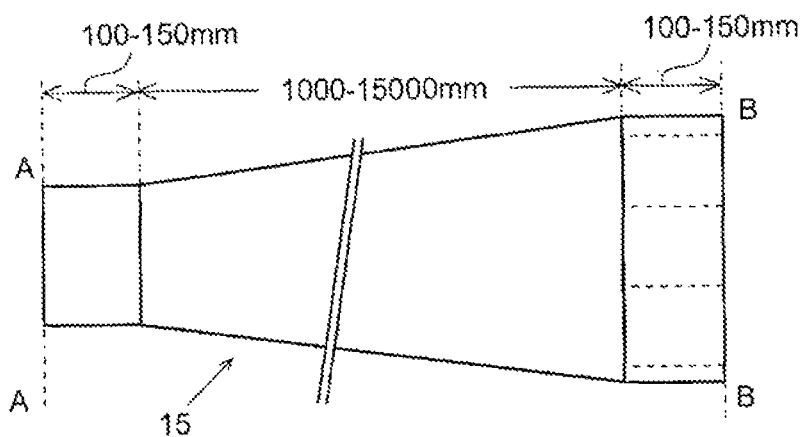
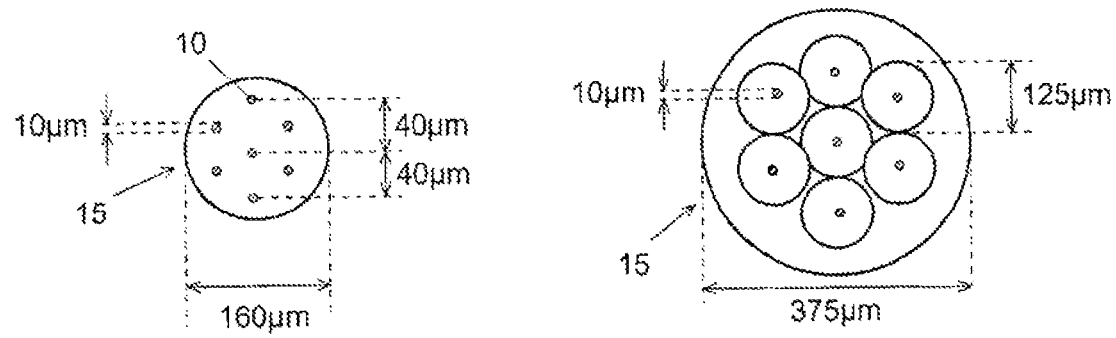
Fig. 17B          Fig. 17C

Fig. 18A
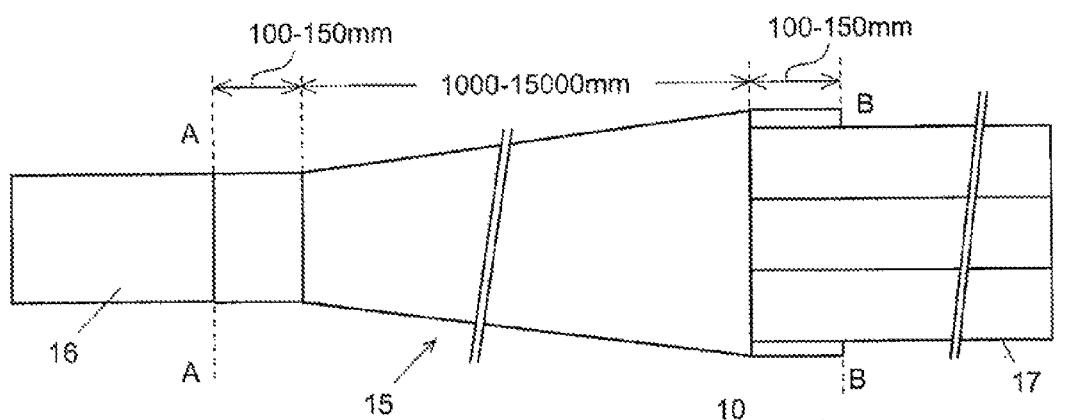
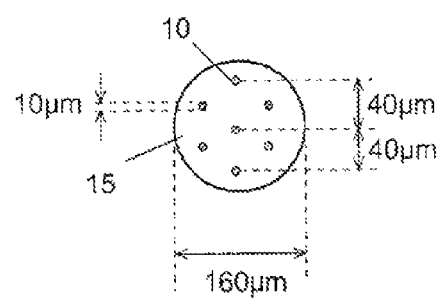
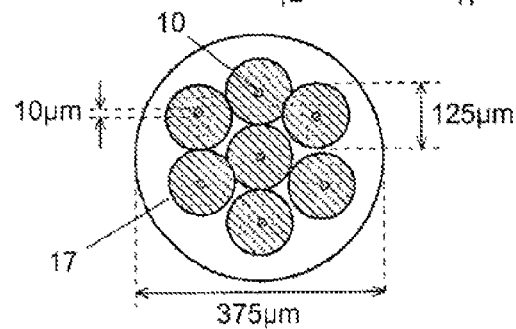
Fig. 18B
Fig. 18C

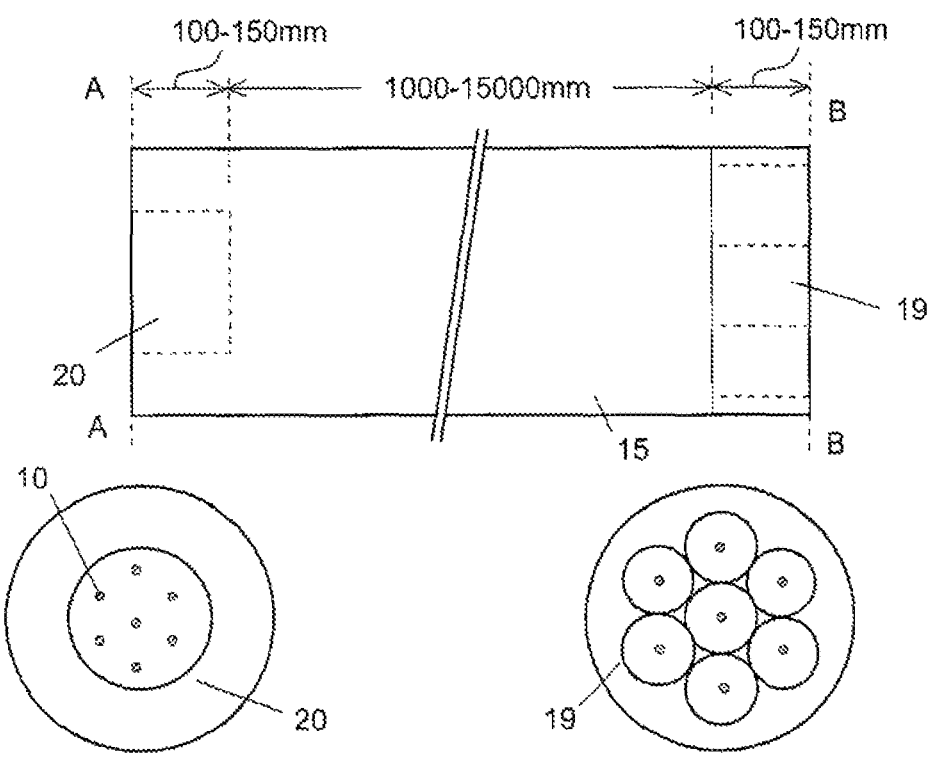

Fig. 34A
Fig. 34C
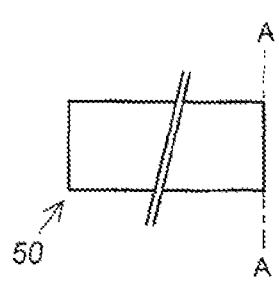
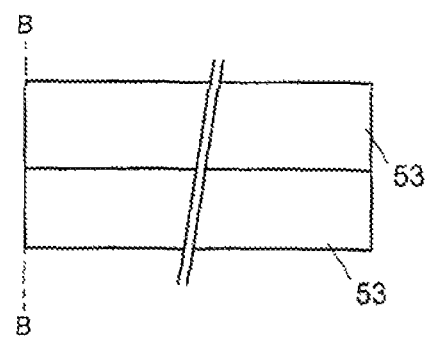
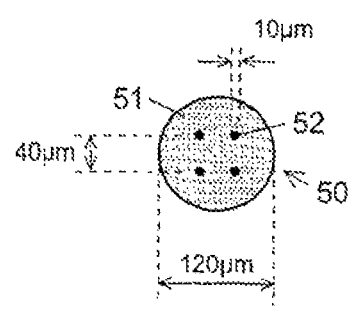
Fig. 34B
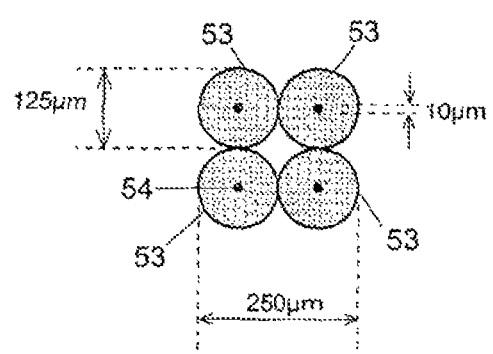
Fig. 34D

Fig. 35A
Fig. 35C
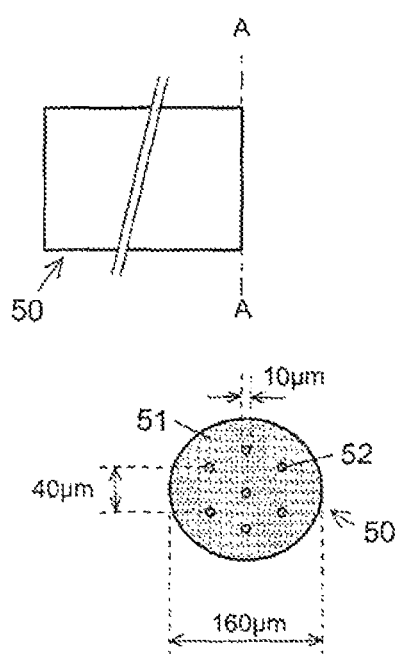
Fig. 35B
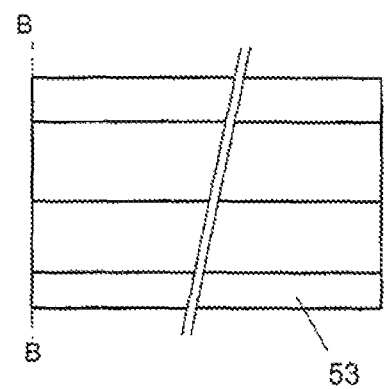
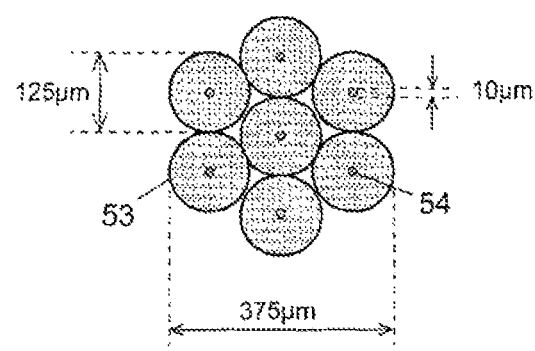
Fig. 35D

OPTICAL CONNECTOR, METHOD FOR MANUFACTURING THE SAME, AND MOLD CONTAINER FOR MANUFACTURING THE SAME

TECHNICAL FIELD

The present invention relates to: an optical connector for optically coupling a multi-core fiber containing a plurality of cores and a plurality of single-mode fibers; a method for manufacturing the optical connector; and a mold container for manufacturing the optical connector.

BACKGROUND ART

In a conventional structure of an optical fiber, one core with a high refractive index is arranged in the center of a cladding material with a low refractive index. Only in recent years, a so-called multi-core fiber, which contains a plurality of cores with high a refractive index, in a cladding material, increasingly attracts attention, because the multi-core fiber is expected to enable large-volume information transmission and high-speed transmission. The multi-core fiber structure itself is not novel.

As illustrated in FIGS. 34A-34D and FIGS. 35A-35D, in a multi-core fiber 50, a plurality of cores 52 (core diameter: approximately 10 µm) with a high refractive index are arranged in a cladding material 51. As the number of cores contained in the multi-core fiber 50 is larger, the multi-core fiber 50 can transmit a larger volume of information at a time. However, the outer diameter of the multi-core fiber 50 should be about 300 µm at the largest, and taking the diameter of each core 52, a core distance necessary to prevent interference among the cores 52, and other factors into consideration, the number of cores arrangeable in the cladding material 51 is four to seven, or about nineteen, at most.

The distance between the cores in the multi-core fiber 50 is normally set to 40 µm to 50 µm, which is adequate to avoid interference of optical signals passing through neighboring cores, and the outer diameter of the multi-core fiber 50 is set to 120 µm to 180 µm accordingly (in an example illustrated in FIGS. 34A-34D, the outer diameter of the multi-core fiber 50 is 120 µm, and the distance between the cores 52 is 40 µm; and in an example illustrated in FIGS. 35A-35D, the outer diameter of the multi-core fiber 50 is 160 µm, and the distance between the cores 52 is 40 µum). In order to transmit information using the multi-core fiber 50 thus configured, a single-mode fiber 53 is connected to each of the plurality of cores 52 in the multi-core fiber 50. Then, optical information that has passed through each core 52 of the multi-core fiber 50 is received by an optical receiver via the single-mode fiber 53, and an optical signal from each of a plurality of optical transmitters is transmitted to each core 52 of the multi-core fiber 50 via the single-mode fiber 53.

CITATION LIST

Patent Literature

[Patent Literature 1] JP 2010-286548 A
[Patent Literature 2] JP 2010-286661 A
[Patent Literature 3] JP 2010-286718 A

SUMMARY OF INVENTION

Technical Problem

Normally, the outer diameter of the single-mode fiber 53 is 125 µm, and the diameter of a core 54 is 10 µm. Hence, if the single-mode fibers 53 are arranged on an end face of the multi-core fiber 50 such that the cores 54 of the single-mode fibers 53 are respectively optically coupled to the cores 52 in a cross section of the multi-core fiber 50, most of the single-mode fibers 53 extend beyond the end circumference, and it is difficult to obtain adequate optical coupling between each core 52 of the multi-core fiber 50 and each single-mode fiber 53.

A method is proposed to cope with the above problem in which an end of the single-mode fiber 53 is narrowed by etching to a diameter as small as about 40 µm to 50 µm, and the narrowed end of the optical fiber is connected to each core 52 of the multi-core fiber 50. However, this method has many problems such as difficulty in handling, mechanical fragility, and difficulty in position adjustment for optical coupling, because the dimension of the narrowed end of the single-mode fiber 53 is too small.

The present invention has an object to provide: an optical connector for optically coupling a multi-core fiber and single-mode fibers, the optical connector being capable of solving the above-motioned conventional problems; a method for manufacturing the optical connector; and a mold container for manufacturing the optical connector.

Solution to Problem

An optical connector according to the present invention, which has been made in order to achieve the above-mentioned object, is an optical connector for connecting: N (N is an integer of 3 to 14) single-mode fibers each containing one core with a high refractive index in a cladding material with a low refractive index; to a multi-core fiber containing N cores with high refractive indexes in a cladding material, with a low refractive index, in such a manner that the cores of the single-mode fibers are respectively optically coupled to the cores of the multi-core fiber. The optical connector includes: a quartz glass cylinder having a first end face to be in contact with the multi-core fiber and a second end race to be in contact with the single-mode fibers; and N glass fibers arranged in the quartz glass cylinder so as to extend from the first end face to the second endface, the N glass fibers each containing: a circular rod with a high refractive index; and a low refractive index material that surrounds an outer periphery of the circular rod. The glass fibers are arranged in the quartz glass cylinder such that: a distance between the glass fibers on the first end face is equal to a distance between the cores (core distance) of the multi-core fiber; and a distance between the glass fibers on the second end face is equal to a core distance of adjacent ones of the N single-mode fibers when they are bundled.

It is preferable that the circular rod have a constant outer diameter over the entire length of each glass fiber, and it is preferable that the low refractive index material have a constant thickness over the entire length of each glass fiber.

If the outer shape of the quarter glass cylinder, that is, the outer shape of the optical connector is circular or polygonal, such as quadrangular or octagonal, the quartz cylinders are easily manufactured. Moreover, their handling and connection with the multi-core fiber and the single-mode fibers is also facilitated. The outer shape of the optical connector may have the same size from one end to the other end in the longitudinal direction. Alternatively, the both ends of the optical connector may be made smaller in diameter step-wisely, or may be tapered. According to such configurations, the structure of the optical connector can be freely changed so as to suit the structures of the multi-core fiber and the single-mode fibers, and a connection loss can be minimized.

It is preferable that the outer diameter of the first end face of the quartz glass cylinder, which is an end face to be in contact with the multi-core fiber, be equal to the outer diameter of the multi-core fiber, and it is preferable that the outer diameter of the second end face of the quartz glass cylinder, which is an end face to be in contact with the N bundled single-mode fibers, be equal to the total outer diameter of the N bundled single-mode fibers.

Further, if the quartz glass cylinder includes, on the first end, a multi-core fiber insertion hole into which the multi-core fiber is to be inserted, the optical connector and the multi-core fiber can be securely connected to each other, and the connection is kept reliable over a long term.

Furthermore, if the quartz glass cylinder includes, on the second end, a single-mode fiber insertion hole into which the N single-mode fibers are to be inserted, the optical connector and the N single-mode fibers can be securely connected to each other, and the connection is kept reliable over a long term.

The connection between the multi-core fiber insertion hole and the multi-core fiber, and the connection between the single-mode fiber insertion hole and the single-mode fibers can be reinforced by an adhesive or fusion.

In the optical connector according to the present invention, it is preferable that the relative refractive index difference between the circular rod and the low refractive index material of each glass fiber be substantially equal to the relative refractive index difference between the core and the cladding material of each of the multi-core fiber and the single-mode fibers optically coupled by the optical connector. In the case where the relative refractive index difference between the core and the cladding material is different between the multi-core fiber and the single-mode fibers, it is preferable that the relative refractive index difference between the circular rod and the low refractive index material of each glass fiber be a value intermediate between the relative refractive index difference in the multi-core fiber and the relative refractive index difference in the single-mode fibers.

It is more preferable if the outer diameter of the circular rod of each glass fiber and the thickness of the low refractive index material provided around the circular rod are constant over the entire length of the glass fiber (optical connector), because the propagation of optical signals in the optical connector is not disturbed. Hence, the optical signals can be propagated with a lower radiation loss and a lower reflection loss. Moreover, the optical signals can be propagated from the single-mode fibers to the multi-core fiber and, conversely, from the multi-core fiber to the single-mode fibers, without any change in propagation conditions.

The outer peripheral surface of the quartz glass cylinder may be provided with marks indicating arrangement of the glass fibers. With the marks, it is easier to align the multi-core fiber and the single-mode fibers to the glass fibers of the optical connector. If the multi-core fiber and the single-mode fibers are also provided with marks, the fiber alignment should be easier by matching the marks of the multi-core/single-mode fibers with the mark of the optical connector.

The optical connector according to the present invention can be manufactured by heating and stretching a connector base material made of quartz glass in the longitudinal direction. When the optical connector is manufactured in this way, the outer diameter of the optical connector is normally reduced to ⅛ to 1/15 of that of the connector base material. Accordingly, the outer diameter of the quartz glass connector base material f may be selected in consideration of the amount of reduction in outer diameter.

The length of the optical connector according to the present invention can be determined depending on the core distance of the multi-core fiber and the bundled single-mode fibers to be connected by the optical connector. That is, as the difference between the core distance of the multi-core fiber and the core distance of the single-mode fibers when bundled is larger, the optical connector should be longer. When the optical, connector is longer, the tilting angle of each glass fiber can be made smaller. In this case, the connection angles between the glass fibers of the optical connector and the cores of the multi-core fiber and the single-mode fibers can be made smaller on either end face (the first end face and the second end face of the quartz glass cylinder), whereby a connection loss can be reduced.

In consideration of the core distance of a general multi-core fiber and that of general single-mode fibers when bundled, the length of the optical connector is preferably set to be larger than 1,000 mm, and preferably smaller than 15,000 mm.

For example, it is supposed that a multi-core fiber (core diameter: 10 µm) having a core distance of 40 µm and single-mode fibers (core diameter: 10 µm) having a core distance (when bundled) of 125 µm are connected by the optical connector of the present invention. In the worst case, the glass fibers in the connector base material are connected with the axes thereof being inclined. In the case where the length of the connector base material is 30 mm, the worst value of the tilting angle of each glass fiber is about 1.6 degrees. In the case where the length thereof is 50 mm, the worst value thereof is about 0.97 degree. Accordingly, a connection loss caused by such tilt can be reduced.

In this regard, because the optical connector of the present invention is formed by heating and stretching the connector base material (for example, the length of the connector base material is stretched 100 times), in the case where the length of the connector base material is 30 mm or 50 mm as described above, the length of the optical connector is 3,000 mm or 5,000 mm, and the tilting angle of the axis of each glass fiber in this case is reduced to 0.16 degrees or 0.1 degrees. In such a case where the tilting angle of the axis of each glass fiber is small, the connection loss between: the optical connector; and the multi-core fiber and the single-mode fibers is theoretically smaller than 0.01 dB, smaller than 0.005 dB per portion, which is extremely small.

Accordingly, the length of the base material may be approximately 30 mm to 50 mm. In the case where the connection loss is desired to be further reduced, the length of the base material may be set to about 150 mm, whereby the length of the optical connector obtained by stretching may be made about 15,000 mm.

From the above, the length of the optical connector is preferably at least 1,000 mm to 15,000 mm.

When the multi-core fiber and the single-mode fibers are optically coupled to each other using the optical connector of the present invention, the multi-core fiber and the single-mode fibers can be connected using an adhesive or are fused to the first end face and the second end face of the quartz glass cylinder. In this case, highly secure connection which is reliable over a long term can be achieved.

A method for manufacturing an optical connector according to one aspect of the present invention includes: arranging N rods in a metal mold container; pouring a $SiO_2$ glass raw material solution containing a hardening resin and a hardener, into the mold container; solidifying the $SiO_2$ glass raw material solution due to a self-hardening reaction caused by a reaction between the hardening resin and the hardener; removing the rods; drying and degreasing the solidified material to obtain a porous glass connector base material including N empty holes; respectively inserting glass fibers into the empty boles of the porous glass connector base material, the glass fibers each including a circular rod with a high refractive index and a low refractive index material that surrounds the outer periphery of the circular rod; heating the porous glass connector base material into which the glass fibers are inserted, to obtain a quartz-glass connector base material; and heating and stretching the quartz glass connector base material in a longitudinal direction, to manufacture an optical connector.

The rods arranged in the mold container may be made of any of metal, plastic, and glass. Moreover, the rods may be made of the same material as that of the glass fibers inserted into the empty holes of the porous glass connector base material.

A method for manufacturing an optical connector according to another aspect of the present invention includes: arranging N glass fibers in a metal mold container, the N glass fibers each including a circular rod with a high refractive index and a low refractive index material that surrounds an outer periphery of the circular rod; pouring a $SiO_2$ glass raw material solution containing a hardening resin and a hardener, into the mold container; solidifying the $SiO_2$ glass raw material solution due to a self-hardening reaction caused by a reaction between the hardening resin and the hardener; removing the mold container; drying and degreasing the solidified material to obtain a porous glass connector base material including the N glass fibers; heating the porous glass connector base material, to obtain a quartz glass connector base material; and heating and stretching the quartz glass connector base material in a longitudinal direction, to manufacture an optical connector.

In each of the above-mentioned manufacturing methods, a plastic coating material may be provided in each of the outer peripheries of the glass fibers that are arranged as the rods in the mold container or the outer peripheries of the glass fibers respectively inserted into the empty holes of the porous glass connector base material. If the coating material is provided, surfaces of the glass fibers are smoothed, and hence the work of removing the glass fibers after solidifying the $SiO_2$ glass raw material solution and the work of respectively inserting the glass fibers into the empty holes are facilitated. The plastic coating material evaporates and disappears in the step of heating the porous glass connector base material, and thus is not contained in the optical connector that is a final product. Here, the coating material can be formed using polyimide, nylon, and the like, and the thickness thereof is preferably approximately 5 µm to 100 µm. If the thickness thereof is larger than this range, the glass fibers may come into contact with each other.

In each of the above-mentioned manufacturing methods, it is preferable that an outer diameter of each rod and types of the hardening resin and the hardener be selected such that: a diameter and a distance between the circular rods on a side of an end face to be in contact with single-mode fibers, of the quartz glass connector base material, are eight times to fifteen times larger than a core diameter and a core distance of the single-mode fibers; and a diameter and a distance between the circular rods on a side of an end face to be in contact with a multi-core fiber, of the quartz glass connector base material, are eight times to fifteen times larger than a core diameter and a core distance of the multi-core fiber.

Moreover, it is preferable that an outer diameter of the circular rod of each glass fiber (that is, a core diameter of each glass fiber) be selected so as to be eight times to fifteen times larger than an outer diameter of each core of the multi-core fiber or eight times to fifteen times larger than an outer diameter of the core of each single-mode fiber.

Further, it is preferable that an outer diameter on a side corresponding to an end face of the optical connector to be in contact with single-mode fibers, of the quartz glass connector base material, be selected so as to be eight times to fifteen times larger than a largest diameter of N bundled single-mode fibers. It is preferable that an outer diameter on a side corresponding to an end face of the optical connector to be in contact with a multi-core fiber, of the quartz glass connector base material, be selected so as to be eight times to fifteen times larger than an outer diameter of the multi-core fiber.

Moreover, it is preferable that the porous glass connector base material be 1.2 times to 1.25 times larger than the quartz glass connector base material, in consideration of its shrinkage by the heating.

Another aspect of the present invention provides a mold container used in each of the above-mentioned methods for manufacturing the optical connector. The mold container includes: two half-split mold containers; and a first lid and a second lid for respectively closing openings at both ends of the half-split mold containers. The first lid and the second lid include linear holes for inserting rods or glass fibers.

In the above-mentioned mold container for manufacturing the optical connector, it is preferable that a shape formed by fitting the two half-split mold, containers to each other be one of a cylindrical shape and an angular tube shape. This shape can be selected as appropriate so as to suit a cross-sectional shape of the optical connector.

A method for manufacturing an optical connector according to still another aspect of the present invention is a method for manufacturing a plurality of optical connectors together. That is, it is assumed that one end face of the porous glass connector base material obtained by using each of the above-mentioned manufacturing methods is A and that the other end face is B. Then, the end face B of a second connector base material is connected in series to the end face B of a first connector base material, and the end face A of a third base material is connected in series to the end face A of the second base material. Repeating such a process, the plurality of porous glass connector base materials are connected in series to each other. Glass fibers are respectively inserted into the empty holes of the plurality of connected porous glass connector base materials. Then, the plurality of porous glass connector base materials into which the glass fibers are inserted are heated, whereby quartz glass connector base materials are obtained. The quartz glass connector base materials are heated and stretched in the longitudinal direction, whereby a plurality of optical connectors are manufactured.

In a method for manufacturing an optical connector according to still another aspect of the present invention, it is assumed that one end face of the porous glass connector base material is A and that the other end face is B. Then, the end face B of a second connector base material is connected in series to the end face B of a first base material, and the end face A of a third base material is connected in series to the end face A of the second base material. Repeating such a process, the plurality of porous glass connector base materials are connected in series to each other. The plurality of connected porous glass connector base materials are heated, whereby quartz glass connector base materials are obtained. Then, glass fibers are respectively inserted into the empty holes of the quartz glass connector base materials. Then, the quartz glass connector base materials into which the glass fibers are inserted are heated and stretched in the longitudinal direction, whereby a plurality of optical connectors are manufactured.

According to each of the above-mentioned manufacturing methods, a plurality of optical connectors can be manufactured in large amounts. Note that the number of connected optical connectors is equal to or more than five, and can be up to around fifty. In this case, if end faces of each porous glass connector base material are grooved or chipped for marks, the marks are useful to cut the base materials into the plurality of optical connectors.

A mold container for manufacturing a large number of connector base materials can be manufactured in the following manner. A fitting having a structure for multi-core fiber connection is provided on one end face of the mold container. Then, the following process is sequentially repeated: two thin plastic spacers including holes for a structure of bundled single-mode fibers are provided in its extension with a distance; two thin plastic spacers including holes for multi-core fiber connection are provided in its further extension with a distance; and two thin plastic spacers including boles for connecting a structure of bundled single-mode fibers are provided in its still further extension with a distance. Then, a fitting having a structure for multi-core fiber connection is provided on an end face of the mold container opposite to the fitting. With the use of the mold container manufactured in this way, the large number of connector base materials can be manufactured.

Advantageous Effects of Invention

In the optical connector according to the present invention, the N glass fibers are located on the first end face of the quartz glass cylinder at the same distance as that of the cores of the multi-core fiber, and the N glass fibers are located on the second end face thereof at the same distance as that of the cores of adjacent ones of the N single-mode fibers when they are bundled. Hence, an end face of the multi-core fiber is connected to the first end face of the quartz glass cylinder, and an end face of the N single-mode fibers bundled together is connected to the second end face of the quartz glass cylinder, whereby the multi-core fiber and the single-mode fibers can be easily optically coupled to each other.

Then, if the relative refractive index difference between the circular rod and the low refractive index material of each glass fiber is made substantially equal to the relative refractive index difference between each core and the cladding material of the multi-core fiber and the relative refractive index difference between the core and the cladding material of each single-mode Fiber, the connection between the optical connector and the multi-core fiber and the connection between the optical connector and the single-mode fibers can be achieved with almost no connection loss, and reflection light from connection end faces is not generated. Moreover, if the core diameters of the glass fibers, the multi-core fiber, and the single-mode fibers are made equal to each other, the connection can be achieved with an extremely low loss. Further, the core diameter of the glass fiber and the thickness of the low refractive index material in the optical connector are kept constant even after the stretching, and hence optical signals can be propagated without any change in propagation conditions of the optical signals.

In order to suppress a reflection loss from the connection end faces, it is desirable that the relative refractive index difference between each core and the cladding material of the multi-core fiber and the relative refractive index difference between the core and the cladding material of each single-mode fiber be equal to the relative refractive index difference between the circular rod and the low refractive index material of each glass fiber, but, if the core diameters of these fibers are equal to each other, the reflection loss can be reduced by applying a refractive index matching oil to the connection end faces.

Further, if the outer diameter of the first end face of the quartz glass cylinder of the optical connector is made equal to the outer diameter of the multi-core fiber and if the outer diameter of the second end face thereof is made equal to the total outer diameter of the N single-mode fibers bundled together, the connection of the optical connector with the multi-core fiber and the N single-mode fibers can be further facilitated. Moreover, in the case where the connections of the optical connector with the multi-core fiber and the single-mode fibers are covered for protection with plastic tubes or metal tubes after completion of the connection of the optical connector with the multi-core fiber and the single-mode fibers, if the outer diameters thereof are the same as each other as described above, a simple and stable structure can be used for the protection. Note that the connections can be firmly reinforced by an adhesive or fusion.

Moreover, the method for manufacturing the optical connector according to the one aspect of the present invention includes: arranging the N rods in the metal mold container; pouring the $SiO_2$ glass raw material solution containing the hardening resin and the hardener, into the mold container; solidifying the $SiO_2$ glass raw material solution due to the self-hardening reaction caused by the reaction between the hardening resin and the hardener; removing the rods; drying and degreasing the solidified material to obtain the porous glass connector base material including the N empty holes; respectively inserting the glass fibers into the empty holes of the porous glass connector base material, the glass fibers each including the circular rod with the high refractive index and the low refractive index material that surrounds the outer periphery of the circular rod; heating the porous glass connector base material into which the glass fibers are inserted, to obtain the quartz glass connector base material; and heating and stretching the quartz glass connector base material in the longitudinal direction, to manufacture the optical connector. According to this manufacturing method, even if the distance between the N cores of the multi-core fiber and the distance between the cores of the N bundled single-mode fibers are significantly different from each other, the quartz glass connector base material is heated and stretched in the longitudinal direction, whereby the optical connector capable of connecting the multi-core fiber and the single-mode fibers while matching the cores of the multi-core fiber and the cores of the single-mode fibers can be easily and reproducibly manufactured. Moreover, the time required to heat and stretch the quartz glass connector base material is at most approximately one minute, and hence a large number of optical connectors can be manufactured in a short time.

Moreover, assuming that the stretching ratio at the time of stretching the quart glass connector base material is P, the outer diameter of each glass fiber of the optical connector obtained by stretching the base material is reduced to 1/P of the outer diameter of each glass fiber of the base material. Accordingly, if the reduction ratio P at the time of the stretching is set to an appropriate value, a difference in diameter between: the cores of the multi-core fiber and the single-mode fibers; and the cores of the glass fibers of the optical connector can be made extremely smaller, so that the optical connector with a lower connection loss can be achieved. The glass fibers respectively inserted into the empty holes of the quartz glass connector base material may each have an arbitrary length, and may protrude from both the ends of the base material. Such protruding portions of the glass fibers from both the ends are useful to stretch the quartz glass connector base material while pulling both the ends of the glass fibers. The protruding portions of the glass fibers from both the ends are cut after the stretching, and the multi-core fiber and the single-mode fibers are connected to the optical connector.

Further, the method for manufacturing the optical connector according to the another aspect of the present invention includes: arranging the N glass fibers in the metal mold container, the N glass fibers each including the circular rod with the high refractive index and the low refractive index material that surrounds the outer periphery of the circular rod; pouring the $SiO_2$ glass raw material solution containing the hardening resin and the hardener, into the mold container; solidifying the $SiO_2$ glass raw material solution due to the self-hardening reaction caused by the reaction between the hardening resin and the hardener; removing the mold container; drying and degreasing the solidified material to obtain the porous glass connector base material including the N glass fibers; heating the porous glass connector base material to obtain the quartz glass connector base material; and heating and stretching the quartz glass connector base material in the longitudinal direction, to manufacture the optical connector. According to this manufacturing method, the optical connector can be completed through easier processes. Moreover, this manufacturing method includes arranging the glass fibers in the mold container, and does not include respectively inserting the glass fibers into the empty holes, and hence surfaces of the glass fibers are less likely to be contaminated and damaged. Moreover, there is no fear that the interface between each glass fiber and the quartz glass cylinder may be roughened, and hence the connector with a low scattering loss can be provided. Note that, in the case where portions of the glass fibers protrude from both the ends of the porous glass connector base material at the time of heating the base material, the portions protruding from both the ends may be protected by protective members or may be cut, in order to prevent the protruding portions from being deformed by heat. Moreover, also in this method, the protruding portions of the glass fibers from the both the ends of the quartz glass connector base material may each have an arbitrary length, and can be used at the time of heating and stretching the base material. The quartz glass fibers in the empty holes of the quartz glass cylinder are fused and fixed to the quartz glass cylinder at the time of heating the base material.

In each of the above-mentioned manufacturing methods, the outer diameter of each rod and the types of the hardening resin and the hardener are selected such that the diameter of the empty holes and the distance between empty holes on the side of the end face to be in contact with the single-mode fibers, of the quartz glass connector base material, are eight times to fifteen times larger than the core diameter and the core distance of the single-mode fibers; and the empty hole diameter and the empty hole distance on the side of the end face to be in contact with the multi-core fiber, of the quartz glass connector base material are eight times to fifteen times larger than the core diameter and the core distance of the multi-core fiber. Accordingly, commercially available quartz fibers having a core diameter of 80 µm to 150 µm can be used as the glass fibers respectively inserted into the N empty holes of the porous glass connector base material, and hence handling thereof is facilitated. It is desirable that the relative refractive index difference in the quartz fibers be equal to that in the multi-core fiber. Specifically, the core material used for the quartz fibers may be a $SiO_2$ material to which $GeO_2$ is added, and the cladding material used therefor may be $SiO_2$ to which F is added or $SiO_2$. Moreover, as described above, the coating material may be provided on each quartz fiber. The core material used for the quartz fibers may be a $SiO_2$ material, and the cladding material used therefor may be $SiO_2$ to which F is added. In this case, the relative refractive index difference in the quartz fibers is slightly smaller than the relative refractive index difference in the multi-core fiber, but this difference can be tolerated. Further, polarization maintaining fibers (for example, PANDA fibers) each having a large diameter (the core diameter: approximately 50 µm, the outer diameter of the cladding material: approximately 800 µm to 1,000 µm, and the outer diameter of a stress imparting part provided in the cladding material: approximately 100 µm) may be used for the quartz fibers. With the use of the polarization maintaining fibers that are reduced its outer diameter etc. by heating and stretching them into normal polarization maintaining fibers (the core diameter: 5 µm, the outer diameter of the cladding material: approximately 80 µm to 100 µm, and the outer diameter of the stress imparting part provided in the cladding material: approximately 10 µm), the optical connector more resistant to fluctuations in polarization can be provided.

In each of the above-mentioned manufacturing methods, if the core diameter of each glass fiber is made eight times to fifteen times larger than the outer diameter of each core of the multi-core fiber or eight times to fifteen times larger than the outer diameter of the core of each single-mode fiber, commercially available quartz fibers having a core diameter of 80 µm to 150 µm can be used as the glass fibers.

Moreover, if the outer diameter on the side corresponding to the end face of the optical connector to be in contact with the single-mode fibers, of the quartz glass connector base material, is made eight times to fifteen times larger than the largest diameter of the N bundled single-mode fibers and if the outer diameter on the side corresponding to the end face of the optical connector to be in contact with the multi-core fiber, of the quartz glass connector base material, is made eight times to fifteen times larger than the outer diameter of the multi-core fiber, handling and processing of the quartz glass connector base material are facilitated.

Further, if the porous glass connector base material is made 1.2 times to 1.25 times larger than the quartz glass connector base material in consideration of its shrinkage by the heating, the quartz glass connector base material obtained by heating the porous glass connector base material can have an appropriate size. In order to suppress the shrinkage ratio at the time of heating the porous glass connector base material to about 18% ((100-82)%) and in order to suppress occurrence of breaks and cracks at the time of heating the same, it is preferable to use a glass raw material solution containing: a hardening resin; and a mixed solution of a dispersant (tetramethylammonium hydroxide solution) and distilled water to which silica powder having a particle diameter of 2 µm or less (preferably 1 µm or less) is added. The used hardening resin can be a liquid resin called DENACOL EX512. The hardener of the glass raw material solution is preferably triethylenetetramine. The mixing proportions (weight %) of the materials that is particularly preferable to obtain the above-mentioned shrinkage ratio is the silica powder: 87%, the distilled water: 21.2%, the dispersant: 2.7%, and the hardening resin:

10.1%. If the mixing proportion of the silica powder is set to be overwhelmingly high as described above, the shrinkage ratio can be suppressed to be low, and breaks and cracks can be prevented. The amount of impurities such as a CH group and an OH group can be reduced, and the connector with a low loss can be obtained.

Moreover, the mold container for manufacturing the optical connector according to the one aspect of die present invention includes the two half-split mold containers, and thus can manufacture connectors having various shapes and structures with a high dimension precision. Moreover, if the first and second lids of the half-split mold containers are provided with the linear holes for inserting rods or glass fibers, axis bending can be reduced in the connections between the optical connector and the cores of the multi-core fiber and between the optical connector and the cores of the single-mode fibers, and the connections therebetween can be easily achieved with a low loss. In this case, the length of each linear hole is preferably 5 mm or more, approximately 30 mm.

The mold container for manufacturing a large number of base materials for optical connectors can be manufactured in the following manner. The fitting having the structure for multi-core fiber connection is provided on one end face of the mold container. Then, the following process is sequentially repeated: two thin plastic spacers including holes for a structure of bundled single-mode fibers are provided in an extension thereof with a distance; two thin plastic spacers including holes for multi-core fiber connection are provided in a further extension thereof with a distance; and two thin plastic spacers including holes for a structure of bundled single-mode fibers are provided in a still further extension thereof with a distance. Then, the fitting having the structure for multi-core fiber connection is provided on the end face of the mold container opposite to the above fitting. With the use of the mold container manufactured in this way, the large number of base materials for optical connectors can be manufactured, and the costs of the optical connectors can be reduced.

BRIEF DESCRIPTION OF THE DRAWINGS

FIG. 2A, FIG. 2B, and FIG. 2C are diagrams illustrating a mold container used to manufacture an optical, connector according to a first embodiment of the present invention.

FIG. 3A, FIG. 3B, and FIG. 3C are diagrams illustrating a porous glass connector base material obtained using the mold container of FIG. 2A, FIG. 2B, and FIG. 2C.

FIG. 7A, FIG. 7B, and FIG. 7C are diagrams illustrating an optical connector obtained by heating and stretching the quartz glass connector base material of FIG. 6A, FIG. 6B, and FIG. 6C, the optical connector having an outer diameter reduced to 1/10.

FIG. 8 is a diagram illustrating the state where a multi-core fiber and single-mode fibers are connected to the optical connector.

FIG. 9A, FIG. 9B, and FIG. 9C are diagrams illustrating a mold container for manufacturing an optical connector according to a second embodiment of the present invention.

FIG. 10A, FIG. 10B, and FIG. 10C are diagrams illustrating a porous glass connector base material.

FIG. 11 is a diagram illustrating a mold container for manufacturing an optical connector according to a third embodiment of the present invention.

FIG. 12A, FIG. 12B, and FIG. 12C are diagrams illustrating a porous glass connector base material according to a fourth embodiment of the present invention.

FIG. 13A, FIG. 13B, and FIG. 13C are diagrams illustrating a quartz glass connector base material obtained by heating, at a high temperature, and vitrifying the porous glass connector base material illustrated in FIG. 12A, FIG. 12B, and FIG. 12C into transparent glass.

FIG. 15A, FIG. 15B, and FIG. 15C are diagrams illustrating a quartz glass connector base material according to a fifth embodiment of the present invention.

FIG. 16A, FIG. 16B, and FIG. 16C are diagrams illustrating the quartz glass connector base material including empty holes into which glass fibers are respectively inserted.

FIG. 17A, FIG. 17B, and FIG. 17C are diagrams illustrating an optical connector obtained by heating and stretching the quartz glass connector base material.

FIG. 18A, FIG. 18B, and FIG. 18C are diagrams illustrating an example in which fibers are connected to the optical connector.

FIG. 19A, FIG. 19B, and FIG. 19C are diagrams illustrating an optical connector according to a sixth embodiment of the present invention.

FIG. 34A, FIG. 34B, FIG. 34C, and FIG. 34D are diagrams for describing a conventional technique, FIG. 34A and FIG. 34C are respective front views of a multi-core fiber and single-mode fibers, and FIG. 34B and FIG. 34D are respective cross-sectional views thereof.

FIG. 35A, FIG. 35B, FIG. 35C, and FIG. 35D are diagrams for describing a conventional technique, FIG. 35A and FIG. 35C are respective front views of another multi-core fiber and another single-mode fibers, and FIG. 35B and FIG. 35D are respective cross-sectional views thereof.

DESCRIPTION OF EMBODIMENTS

Figure 1:
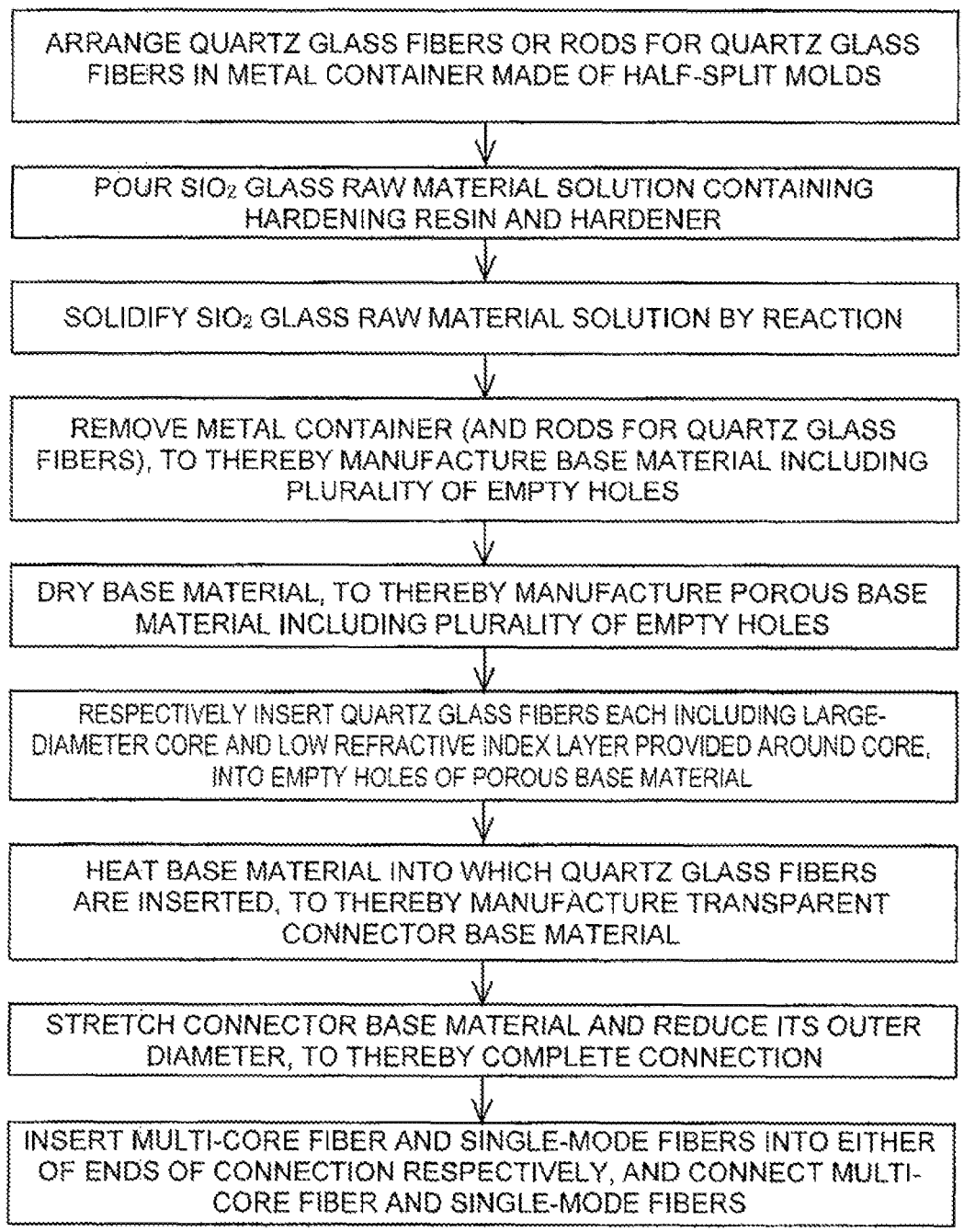
FIG. 1 is a flowchart of a method for manufacturing an optical connector according to the present invention.

An optical connector of the present invention is an optical connector for respectively optically coupling cores of N single-mode fibers to N cores of a multi-core fiber. FIG. 1 illustrates an example procedure for manufacturing the optical connector of the present invention.

In the procedure illustrated in FIG. 1, first, part of large-diameter quartz glass fibers or metal or plastic rods equivalent thereto are arranged at predetermined distances in a metal container with a lid, which is one half-split mold. After that, the remaining part of the large-diameter quartz glass fibers or the metal or plastic rods equivalent thereto are arranged at predetermined distances in a metal container with a lid, which is another half-split mold. Then, a cylindrical metal container is configured by putting one of the metal containers on top of the other metal container. As a result, the large-diameter quartz glass fibers or the rods equivalent thereto are arranged at predetermined distances inside of the cylindrical metal container.

Subsequently, a $SiO_2$ glass raw material solution containing a hardening resin and a hardener is poured into the cylindrical metal container, and is solidified due to a self-hardening reaction caused by a reaction between the hardening resin and the hardener.

Subsequently, the cylindrical metal container or the cylindrical metal container and the quartz fibers (or the metal or plastic rods) are removed, and the solidified material is dried and degreased, whereby a porous glass connector base material is obtained.

After that, the porous glass connector base material or the glass connector base material including a plurality of empty holes into which large-diameter glass fibers are respectively inserted is heated in a high-temperature electric furnace, whereby a connector base material vitrified into quartz glass is obtained.

After that, the connector base material vitrified into quartz glass is heated and stretched in the longitudinal direction, whereby a connector for connecting a multi-core fiber and single-mode fibers is manufactured.

Hereinafter, specific embodiments of the present invention are described.

First Embodiment

An optical connector according to a first embodiment of the present invention is described with reference to FIGS. 2A to 9C.

FIGS. 2A to 2C illustrate a mold container used to manufacture the optical connector according to the first embodiment. The metal container 1 is a cylindrical container formed by combining one semi-cylindrical half-split container 1-1 and one semi-cylindrical half-split container 1-2. Both the ends of the metal container 1 are hermetically closed by an upper lid 4 and a lower lid 5. The upper lid 4 and the lower lid 5 each have a plate thickness F larger than that of a side wall of the metal container 1, and a plurality of linear holes for arranging metal rods for quartz glass fibers at desired a distance are formed in the upper lid 4 and the lower lid 5. The plate thickness F is preferably 1 cm to 5 cm. As the plate thickness F is larger, the tilting angle of each rod in the container can be made smaller, and the connector with a lower loss can be achieved as described later.

A plurality of (for example, seven, assuming connection of a multi-core fiber including seven cores at a core distance of 40 μm) metal rods 3 are arranged in the metal container 1 configured as described above. In the present embodiment, in consideration of a shrinkage ratio T: 18% at the time of heating to be described later, the used metal rod 3 has an outer diameter of 134 μm. Moreover, with regard to the arrangement of the metal rods 3, the cores and the core distance of the multi-core fiber are assumed on one side (see FIG. 2B) of the metal container 1, and seven bundled single-mode fibers are assumed on the other side (see FIG. 2C). In order to keep such arrangement, both the ends of the metal rod 3 are fixed to a fixing unit (not illustrated) provided behind the metal container 1.

After that, a mixed solution 2 of: a quartz glass solution containing a hardening resin; and a hardener is poured into the metal container 1, and is solidified due to a self-hardening reaction. Then, the metal container 1 and the metal rods 3 are removed. Alter that, the solidified material is dried, whereby a porous glass connector base material 8 illustrated in FIGS. 3A to 3C is obtained. In the present embodiment, the used quartz glass solution is prepared by adding silica powder having a particle diameter of 2 μm or less (preferably 1 μm or less) to a mixed solution of a dispersant (tetramethylammonium hydroxide solution) and distilled water. The used hardening resin is a liquid resin called DENACOL EX512 (Nagase ChemteX Corporation). Moreover, the used hardener is triethylenetetramine. Further, in order to obtain the shrinkage ratio T: 18%, the mixing proportions (weight %) of the materials of the quartz glass solution and the hardener is set such that the silica powder is 87%, the distilled water is 21.2%, the dispersant is 2.7%, and the hardening resin is 10.1%. With the use of the quartz glass solution described above, the $SiO_2$ porous glass connector base material 8 can be obtained.

Here, as a length L in the metal container 1 is larger, the metal rods 3 can be arranged at a smaller tilting angle, which is more preferable. However, if the length L is set to be excessively large, the glass connector becomes longer accordingly, and hence the length L is preferably within a range of 10 mm to 150 mm. If the length L is set to, for example, 10 mm, a tilting angle θ of each metal rod 3 arranged in the container 1 is about 5.9 degrees, and the metal rods 3 can be arranged with a slight tilt in the container 1. Moreover, if the length L is set to 30 mm, the tilting angle θ of each metal rod 3 arranged in the container 1 is about 1.98 degrees, and the metal rods 3 can be arranged with an very slight tilt in the container 1.

Further, the thickness F of each of the upper lid and the lower lid of the metal container 1 is set to be large, that is, 5 mm or more, approximately 50 mm, whereby the multi-core fiber and the single-mode fibers can be connected to the optical connector with a smaller tilt of axes thereof.

Next, the configuration of the porous glass connector base material 8 obtained using the metal container 1 is described with reference to FIGS. 3A to 3C. FIG. 3A is a top view of the porous glass connector base material 8, FIG. 3B is a view of an end face A-A of FIG. 3A, and FIG. 3C is a view of an end face B-B of FIG. 3A. The inside of the $SiO_2$ porous glass connector base material 8 is provided with seven empty holes 9. In this case, at a left end face 6 of the base material 8, the empty holes 9 is provided at a core distance that is assumed to be when the multi-core fiber including the seven cores is enlarged ten times. Meanwhile, at a right end face 7 of the base material 8, the empty holes 9 is provided at a core distance that is assumed to be when the seven bundled single-mode fibers each having an outer diameter of 125 μm are enlarged ten times.

That the dimensions of the porous glass connector base material 8 are designed assuming that the base material 8 is shrunk by heating to about 82% (the shrinkage ratio is 18%) in the dimensions thereof before the heating. Moreover, the length of the porous glass connector base material 8 is designed in consideration of stretching the base material 8 such that a cross section thereof is uniformly reduced to 1/10.

Assuming that: the shrinkage ratio at the time of heating the porous glass connector base material 8 is T; and the reduction ratio at the time of stretching the base material 8 to be described later is 1/P, the outer diameter of each end face of the base material 8 is P/(1−T) times of the outer diameter of the multi-core fiber or the outer diameter of the plurality of bundled single-mode fibers. Moreover, in the case where the length of the porous glass connector base material 8 is set to 30 mm to 150 mm and is stretched 100 times, the length of the manufactured connector is within a range of 3,000 mm to 15,000 mm.

Moreover, in the case where the outer diameter of the seven bundled single-mode fibers, each having an outer diameter of 125 μm, is 375 μm and where the seven bundled single-mode fibers are connected to the optical connector, the outer diameter of the end face 7 of the porous glass connector base material 8 is about 4,573 μm that is 10/0.82 times of 375 μm. The outer diameter of the left end face 6 is set in a similar manner. The dimensions of other portions of the porous glass connector base material 8 are illustrated in FIGS. 3A to 3C.

Figure 4A:
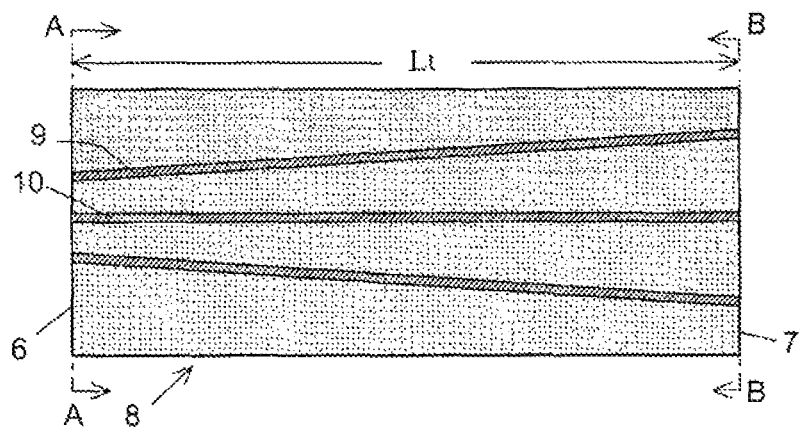
FIG. 4A, FIG. 4B, and FIG. 4C are diagrams illustrating the porous glass connector base material including empty holes into which glass fibers are respectively inserted.
Figure 4B:
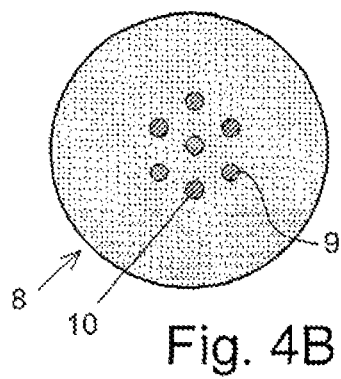
Figure 4C:
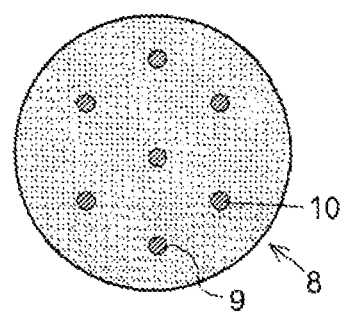
Figure 5B:
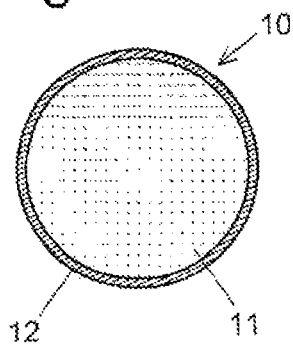
FIG. 5A and FIG. 5B are diagrams illustrating a structure of the glass fiber.
Figure 5A:
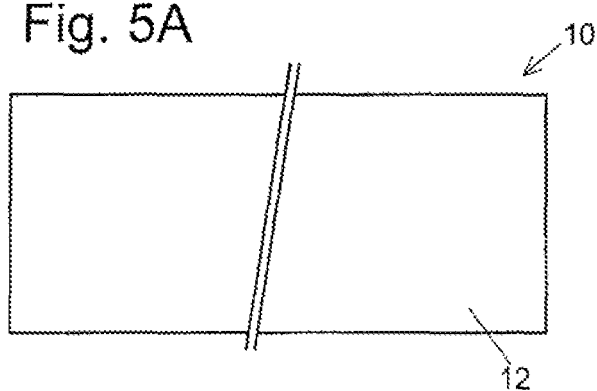

As illustrated in FIGS. 4A to 4C, quartz fibers 10, each having a diameter of 110 μm, are respectively inserted into the empty holes 9 of the porous glass connector base material 8 illustrated in FIGS. 3A to 3C. As illustrated in FIGS. 5A and 5B, each quartz fiber 10 includes a core 11 (outer diameter: 80 μm to 100 μm) in the center and a thin film (cladding material) 12 that covers the outer periphery of the core 11. The material used for the core 11 is $SiO_2$ or $SiO_2$ to which at least one additive (for example, $GeO_2$, $P_2O_5$, and $TiO_2$) for increasing a refractive index is added. The material used for the thin film 12 is $SiO_2$ (thickness: 10 μm to 30 μm) to which F is added.

$SiO_2$ to which at least one additive (for example, $GeO_2$, $P_2O_5$, and $TiO_2$) for increasing a refractive index is added may be used for the core 11 (outer diameter: 100 μm to 110 μm), and $SiO_2$ to which F is not added may be used for the thin film 12 in the outer periphery thereof. A plastic coating material may be provided in the outer periphery of each quartz fiber. Moreover, long portions of the quartz fibers 10 may protrude from one of or both of the ends of the connector base material f 8. The portions of the quartz fibers 10 that protrude from both the ends of the connector base material 8 can be used to pull the quartz fibers 10 at the time of heating and stretching the base material 8. The portions of the quartz fibers 10 that protrude from both the ends of the connector base material 8 are cut after the stretching.

Figure 6A:
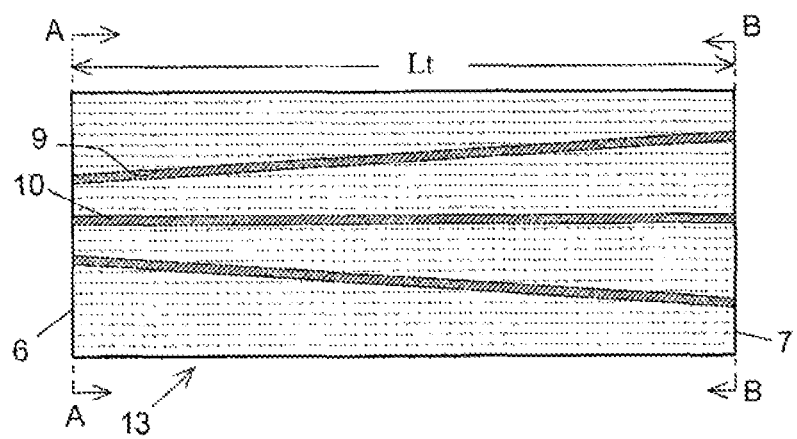
FIG. 6A, FIG. 6B, and FIG. 6C are diagrams illustrating a quartz glass connector base material obtained by heating, at a high temperature, and vitrifying the porous glass connector base material illustrated in FIG. 4A, FIG. 4B, and FIG. 4C into transparent glass.
Figure 6B:
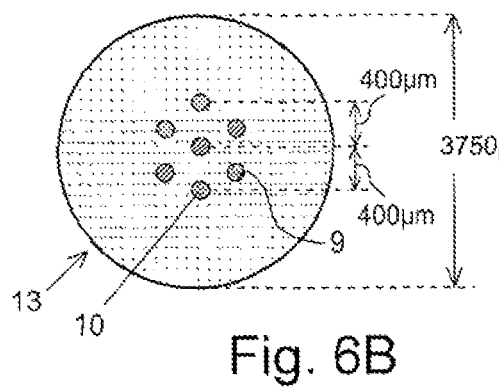
Figure 6C:
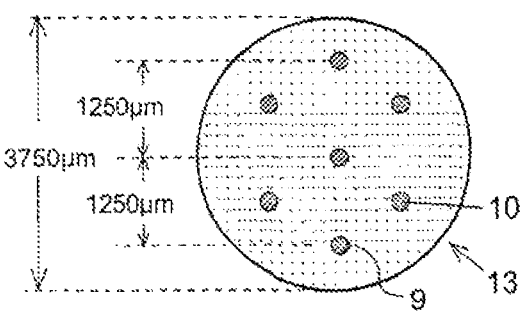

The porous glass connector base material 8 including the empty holes 9 into which the quartz fibers 10 are respectively inserted is heated at a high temperature to be vitrified into transparent glass, whereby a quartz glass connector base material 13 illustrated in FIGS. 6A to 6C is obtained. The quartz glass connector base material 13 is shrunk by the high-temperature heating of the porous glass connector base material 8, to about 82% (the shrinkage ratio is 18%) of the dimensions of the base material 8 before the high-temperature heating. The quartz fibers 10 are respectively fused by the high-temperature heating to the empty holes of the quartz glass connector base material 13 vitrified into transparent glass. As a result of the shrinkage by the high-temperature heating, the distance between the quartz fibers 10 becomes 400 μm on the left end face 6 of the quartz glass connector base material 13, and becomes 1,250 μm on the right end face 7 thereof. Moreover, the outer diameter of the quartz glass connector base material 13 becomes 3,750 μm. Long portions of the quartz fibers 10 may protrude also from one of or both of the ends of the quartz glass connector base material 13. If the long portions protrude therefrom, the portions can be used to pull the quartz fibers 10 at both the ends at the time of heating and stretching the base material 13. The portions of the quartz fibers 10 that protrude from both the ends of the quartz glass connector base material 13 are cut after the stretching.

FIGS. 7A to 7C illustrate an optical connector 15 obtained by heating and stretching the quartz glass connector base material 13 illustrated in FIGS. 6A to 6C. As a result of stretching the quartz glass connector base material 13 as described above, the outer diameter and the core distance of the optical connector 15 become 1/10 of those of the quartz glass connector base material 13. In the case where the length of the quartz glass connector base material 13 is 30 mm, if the outer diameter of the base material 13 is reduced to 1/10 by heating and stretching the base material 13, the length of the optical connector 15 becomes 300 mm. Here, because the core diameter and the thickness of the coating material of each quartz glass fiber become 1/10 and are reduced to constant values in the length direction of the optical connector as a result of the heating and stretching, propagation conditions of optical, signals (the state where almost no mode change or light radiation occurs under single-mode propagation conditions) can be maintained. If the outer diameter of each single-mode fiber is thinned to approximately 40 μm by chemical etching as in conventional methods, the cladding material is tapered to be thinner toward the leading end thereof, and propagation conditions of optical signals unfavorably change, whereas such a problem does not arise in the present invention.

FIG. 8 illustrates the state where a multi-core fiber 16 and single-mode fibers 17 are connected to the optical connector 15 illustrated in FIGS. 7A to 7C. In FIG. 8, the multi-core fiber 16 including seven cores is connected to the left end face of the optical connector 15, and the seven bundled single-mode fibers 17 are connected to the right end face thereof. In this way, with the use of the optical connector 15 of the present embodiment, the cores of the single-mode fibers can be respectively connected with a high coupling efficiency to the seven cores of the multi-core fiber. That is, optical signals from the cores of the single-mode fibers can be respectively propagated into the quartz glass fibers each having a uniform core diameter and a uniform thickness of the coating material, and then the optical signals can be efficiently propagated into the cores of the multi-core fiber. Here, if polarization maintaining fibers are used for the quartz fibers, polarization maintaining is possible, and hence the optical connector that is low in loss even against fluctuations in a polarization state can be provided.

Second Embodiment

FIGS. 9A to 10C illustrate a second embodiment of the present invention. The present embodiment is different from the first embodiment in that the quartz fibers 10 are arranged at predetermined positions in the metal container 1 instead of the plurality of metal rods 3, whereby a porous glass connector base material is obtained.

FIGS. 10A to 10C illustrate a quartz glass connector base material 13 obtained by heating, at a high temperature, and vitrifying the porous glass connector base material obtained using the metal container 1 illustrated in FIGS. 9A to 9C, into transparent glass. FIG. 10A is a top view of the quartz glass connector base material 13, FIG. 10B is a view of an end face A-A of FIG. 10A, and FIG. 10C is a view of an end face B-B of FIG. 10A. Although detailed description is omitted, in the present embodiment, the outer diameter of the end face A-A of the quartz glass connector base material 13 and the diameter and the distance between the quartz fibers 10 are set such that the outer diameter of the optical connector obtained after stretching is equal to the outer diameter of the multi-core fiber. The outer diameter of the end face B-B of the quartz glass connector base material 13 and the diameter and the distance between the quartz fibers 10 are set so as to be respectively equal to the outer diameter, the core diameter, and the core distance of the seven bundled single-mode fibers.

Third Embodiment

FIG. 11 illustrates the metal container 1 used to manufacture a connector base material according to a third embodiment of the present invention. The present embodiment is different from the first embodiment in shapes of the upper lid 4 and the lower lid 5 of the metal container 1. That is, a step part 4-1 and a step part 5-1 are respectively formed on the inner surfaces of the upper lid 4 and the lower lid 5 of the metal container 1, and have inner diameters smaller than the inner diameters of other portions of the metal container 1. Hence, the outer diameters of both the ends of a porous glass connector base material obtained using the metal container 1 thus configured are smaller than the outer diameters of other portions thereof. Hence, at the time of stretching a quartz glass connector base material obtained by heating the porous glass connector base material, both the ends thereof are easier to grip, and this facilitates the stretching. The shapes of the inner surfaces of the upper lid 4 and the lower lid 5 of the metal container 1 can be various shapes such as a circular shape, a rectangular shape, a polygonal shape, and a tapered shape.

Fourth Embodiment

FIGS. 12A to 12C illustrate a porous glass connector base material 8 according to a fourth embodiment of the present invention. The outer diameter at the left end and the outer diameter at the right end of the porous glass connector base material 8 are different from each other. That is, the left end of the porous glass connector base material 8 has a small-diameter circular structure 8-1 suited to connection of the multi-core fiber including the seven cores and having an outer diameter of 160 µm, whereas the right end thereof has a large-diameter circular structure 8-3 suited to connection of the seven bundled single-mode fibers each having an outer diameter of 125 µm. Then, a middle portion between the circular structure 8-1 at the left end and the circular structure 8-3 at the right end has a tapered circular structure 8-2.

FIGS. 13A to 13C illustrate the configuration of a quartz glass connector base material 13 obtained by: respectively inserting the quartz fibers 10 into the empty holes 9 of the porous glass connector base material 8 illustrated in FIGS. 12A to 12C; and heating, at a high temperature, and vitrifying the base material 8 into transparent glass.

Figure 14A:
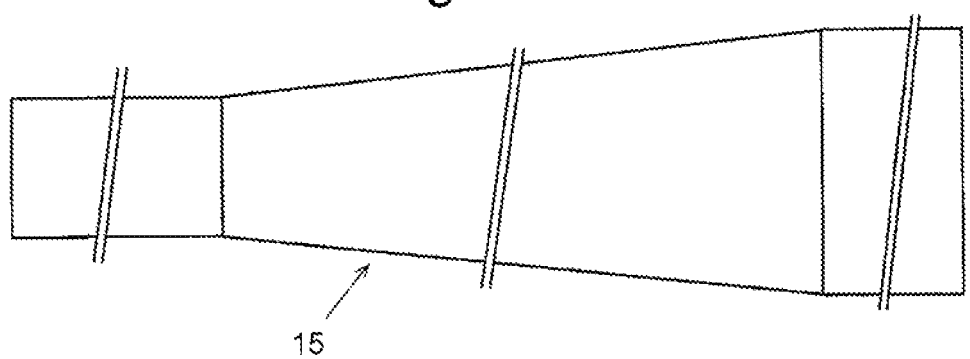
FIG. 14A, FIG. 14B, and FIG. 14C are diagrams illustrating an optical connector obtained by heating and stretching the quartz glass connector base material of FIG. 13A, FIG. 13B, and FIG. 13C.
Figure 14B:
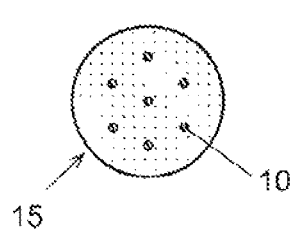
Figure 14C:
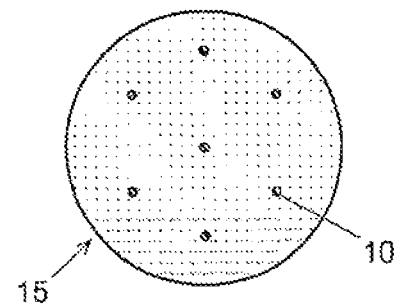
Figure 20A:
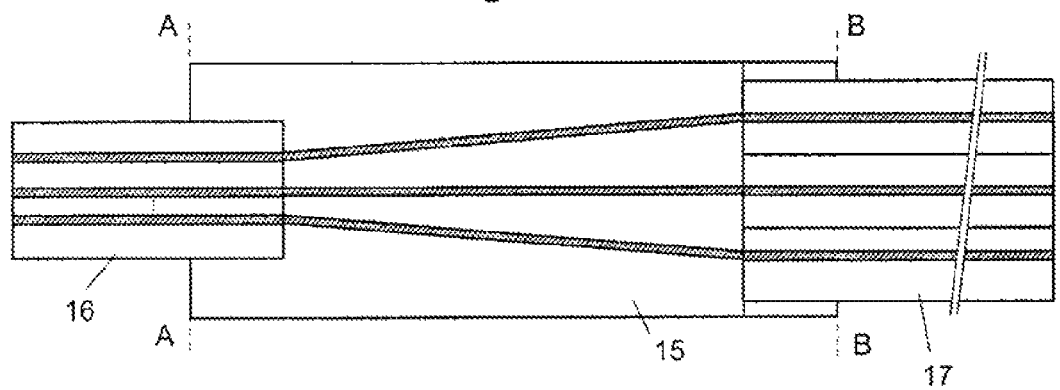
FIG. 20A, FIG. 20B, and FIG. 20C are diagrams illustrating the state where a multi-core fiber and single-mode fibers are connected to the optical connector.
Figure 20B:
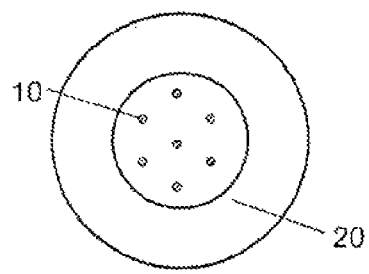
Figure 20C:
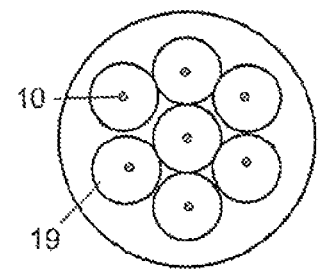

FIGS. 14A to 14C illustrate the configuration of an optical connector 15 obtained by heating and stretching the quartz glass connector base material 13 illustrated in FIGS. 13A to 13C. In the optical connector 15, the outer diameter, the diameter of each quartz fiber 10, and the distance between the quartz fibers 10 are reduced to ¹⁄₁₀ of those of the quartz glass connector base material 13. The length of the optical connector is selected from a range of 1,000 mm to 15,000 mm.

Fifth Embodiment

FIGS. 15A to 15C illustrate the configuration of a quartz glass connector base material 13 according to a fifth embodiment of the present invention. In the present embodiment, after stretching the quartz glass connector base material 13, the outer diameter of the end face A-A is designed so as to become equal to the outer diameter of the multi-core fiber, and the diameter and the distance between the quartz fibers 10 on the end face A-A are designed so as to become equal to the core diameter and the core distance of the multi-core fiber. Moreover, the outer diameter of the end face B-B is designed so as to become equal to the outer diameter of the seven bundled single-mode fibers each having an outer diameter of 125 µm, and the diameter and the distance between the quartz fibers 10 on the end face B-B are designed so as to become equal to the core diameter (10 µm) and the core distance (125 µm) of the single-mode fibers. Further, seven holes into which the single-mode fibers are inserted respectively are formed in the end face B-B. Such a configuration enables high-precision optical coupling between the seven single-mode fibers and the optical connector.

FIGS. 16A to 16C illustrate the quartz glass connector base material 13 including the empty holes 9 into which the quartz fibers 10 each having a diameter of 110 µm are respectively inserted. FIGS. 17A to 17C illustrate an optical connector 15 obtained by heating and stretching the quartz glass connector base material 13.

The outer diameter of the optical connector 15 is reduced to ¹⁄₁₀ of the outer diameter of the quartz glass connector base material 13. As illustrated in FIGS. 18A to 18C, the multi-core fiber including the seven cores is connected to the left end face 6 of the optical connector 15. The seven holes are formed in the right end face 7 of the optical connector 15, and the seven single-mode fibers each having an outer diameter of 125 µm are respectively inserted into the seven holes. As a result, the seven bundled single-mode fibers are connected with a high coupling efficiency to the right end face 7 of the optical connector 15.

Sixth Embodiment

FIGS. 19A to 20C illustrate the configuration of an optical connector 15 according to a sixth embodiment of the present invention. Similarly to the first to fifth embodiments, the optical connector 15 is obtained by heating and stretching a quartz glass connector base material vitrified into transparent glass. The optical connector 15 has the same outer diameter from the left end face 6 to the right end face 7. The left end face 6 is provided with a hole 20 for inserting the multi-core fiber 16 including the seven cores (the same core diameter, the same core distance), and the multi-core fiber 16 is inserted into the hole 20, whereby the multi-core fiber 16 can be connected with a high coupling efficiency to the optical connector 15. Moreover, the right end face 7 is provided with a hole 19 for inserting the seven bundled single-mode fibers 17 each having an outer diameter of 125 μm, and the seven bundled single-mode fibers 17 are inserted into the hole 19, whereby the single-mode fibers 17 can be connected with a high coupling efficiency to the optical connector 15.

Seventh Embodiment

Figure 21A:
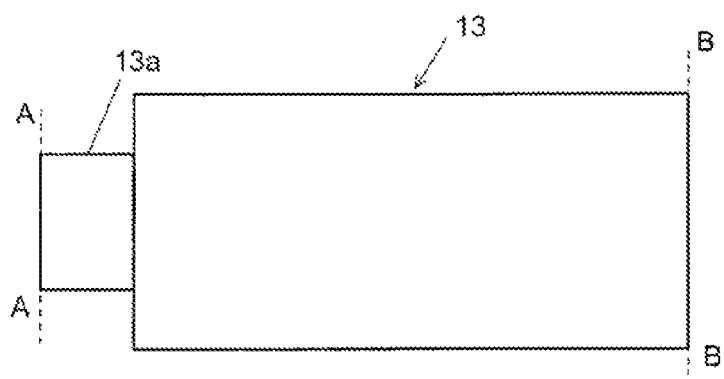
FIG. 21A, FIG. 21B, and FIG. 21C are diagrams illustrating a quartz glass connector base material according to a seventh embodiment of the present invention.
Figure 21B:
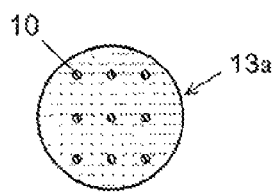
Figure 21C:
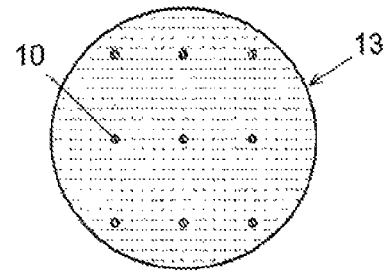

FIGS. 21A to 21C illustrate the configuration of a quartz glass connector base material 13 according to a seventh embodiment of the present invention.

The quartz glass connector base material 13 is a base material used to manufacture an optical connector for optically connecting a multi-core fiber including nine cores and nine single-mode fibers. Nine empty holes 9 are formed in the quartz glass connector base material 13, and the quartz fibers 10 are respectively inserted into the empty holes 9.

In the quartz glass connector base material 13 illustrated in FIGS. 21A to 21C, the multi-core fiber is connected to the left end face 6, and the nine single-mode fibers are connected to the right end face 7. Hence, the left end of the quartz glass connector base material 13 is configured as a smaller-diameter part 13a having an outer diameter that is substantially the same as the outer diameter of the multi-core fiber and is smaller than the outer diameters of other portions of the base material 13.

Modifications

Figure 22A:
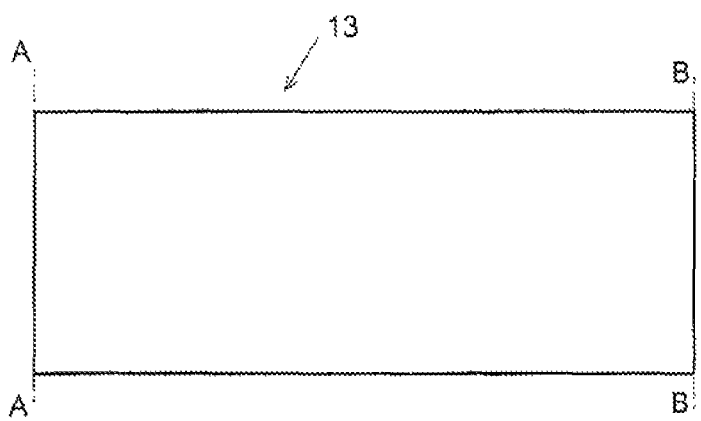
FIG. 22A, FIG. 22B, and FIG. 22C are diagrams illustrating a quartz glass connector base material whose outer shape is a quadrangular shape.
Figure 22B:
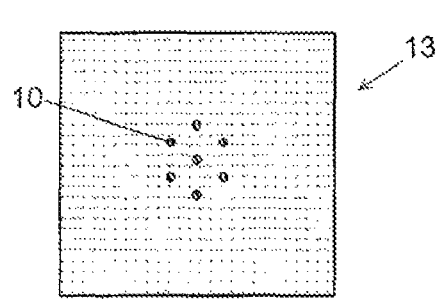
Figure 22C:
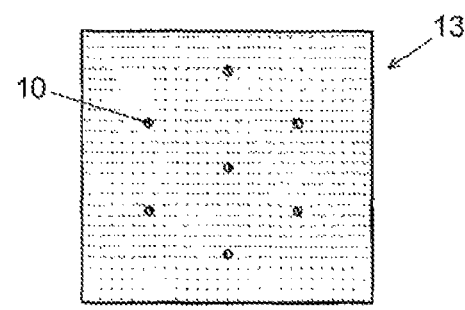
Figure 23A:
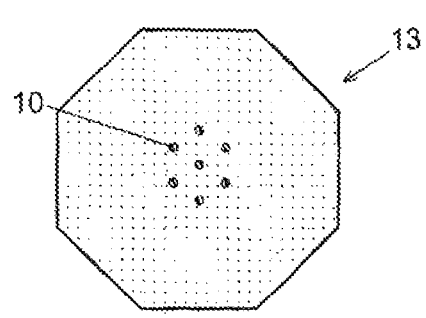
FIG. 23A and FIG. 23B are diagrams illustrating a quartz glass connector base material whose outer shape is an octagonal shape.
Figure 23B:
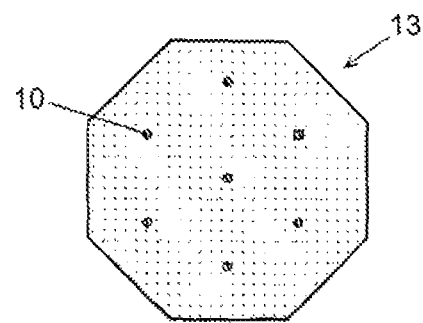

It should be noted that, although the connector base material whose cross-sectional outer shape is a circular shape is described in each of the above-mentioned embodiments, the present invention can also be applied to: a quartz glass connector base material 13 whose cross-sectional outer shape is a quadrangular shape as illustrated in FIGS. 22A to 22C; and a quartz glass connector base material 13 whose cross-sectional outer shape is an octagonal shape as illustrated in FIGS. 23A and 23B.

Figure 24A:
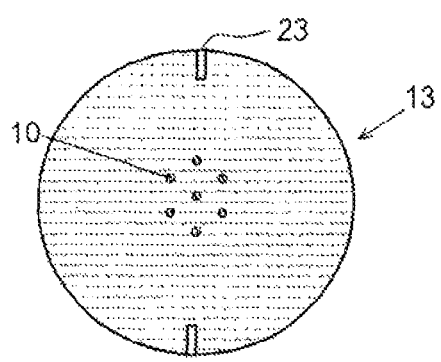
FIG. 24A and FIG. 24B are diagrams illustrating an example in which chipped parts are respectively formed on the upper side and the lower side of the quartz glass connector base material.
Figure 24B:
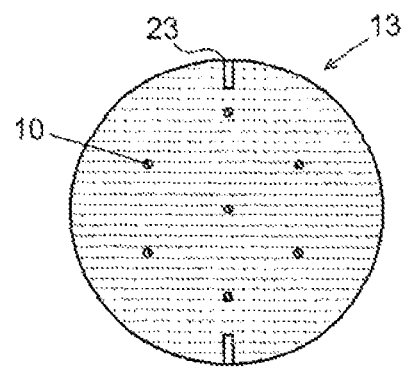

A quartz glass connector base material 13 illustrated in FIGS. 24A and 24B, whose cross-sectional outer shape is a circular shape, is provided with chipped parts 23 on its upper side and its lower side. The chipped parts 23 serve as marks for the top-bottom direction of a connector when the multi-core fiber and the single-mode fibers are connected to the connector.

Figure 25A:
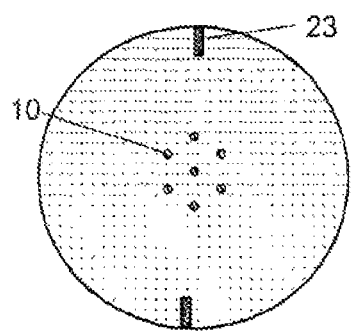
FIG. 25A and FIG. 25B are diagrams illustrating an example in which the chipped parts are colored for discrimination.
Figure 25B:
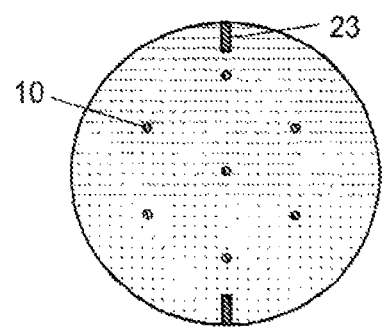

Although it is sufficient that the chipped parts 23 are formed by simply chipping the outer peripheral surface of the quartz glass connector base material 13, if the chipped parts 23 are colored for discrimination after the chipping as illustrated in FIGS. 25A and 25B, the chipped parts 23 serve as clearer marks when the multi-core fiber and the single-mode fibers are connected to the connector. The chipped parts 23 may also be provided in the connector base material whose cross-sectional outer shape is a rectangular shape or an octagonal shape.

Figure 26A:
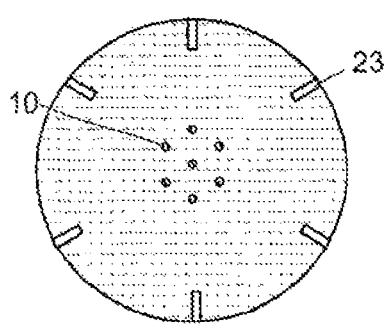
FIG. 26A and FIG. 26B are diagrams illustrating an example in which the chipped parts are provided at six positions on the outer peripheral surface of the quartz glass connector base material.
Figure 26B:
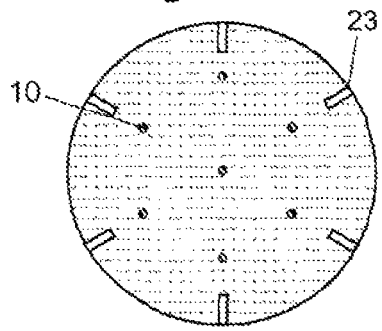

FIGS. 26A and 26B illustrate an example in which the chipped parts 23 are provided at six positions in a circumferential part of the quartz glass connector base material 13 whose cross-sectional outer shape is a circular shape. Each chipped pan 23 is provided at a position corresponding to each quartz fiber 10 inserted into the base material 13. The chipped parts 23 that are provided in one-to-one correspondence with the quartz fibers 10 in this way serve as clearer marks when the multi-core fiber and the single-mode fibers are connected to a connector.

The chipped parts corresponding to the chipped parts 23 are provided at six positions in a circumferential part of a connector obtained by stretching the quartz glass connector base material 13 including the chipped parts 23 in the circumferential part thereof. These chipped parts serve as clearer marks when the multi-core fiber and the single-mode fibers are connected to the connector.

Figure 27:
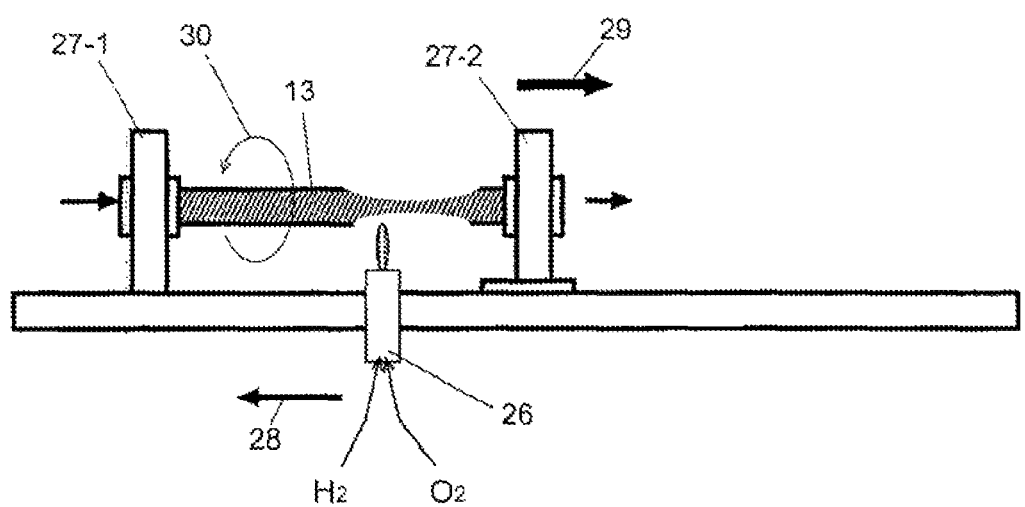
FIG. 27 is a diagram illustrating a small-size lathe machine for stretching the quartz glass connector base material vitrified into transparent glass by means of a heat source and reducing its outer diameter etc.,.

FIG. 27 illustrates a small-size lathe machine for stretching a quartz glass connector base material a 13 vitrified into transparent glass. A procedure for manufacturing an optical connector 15 using this machine is as follows. First, both the ends of the base material for 13 are held by a chuck 27-1 and a chuck 27-2 arranged on both the sides of the lathe, and the base material for 13 is heated by a heat source (acetylene gas burner) 26 at the right end thereof, and the chuck 27-2 is moved at a given stretching speed Vi in a direction indicated by an arrow 29. At the same time, the heat source 26 is moved at a given speed Va (1 mm/sec) in a direction indicated by an arrow 28. Consequently, the quartz glass connector base material 13 is stretched, whereby the optical connector 15 is manufactured.

Although the heat source 26 and the chucks 27-1 and 27-2 are arranged in a lateral direction (horizontal direction) in the above-mentioned machine, the heat source 26 and the chucks 27-1 and 27-2 may be arranged in a vertical direction. A heat source using arc discharge or radio-frequency discharge may be used, and a plurality of types of heat sources may be used in combination. Moreover, if portions of the quartz glass fibers protrude from one of or both of the ends of the connector base material, the connector base material may be stretched while the protruding portions of the quartz glass fibers are pulled.

Figure 28:
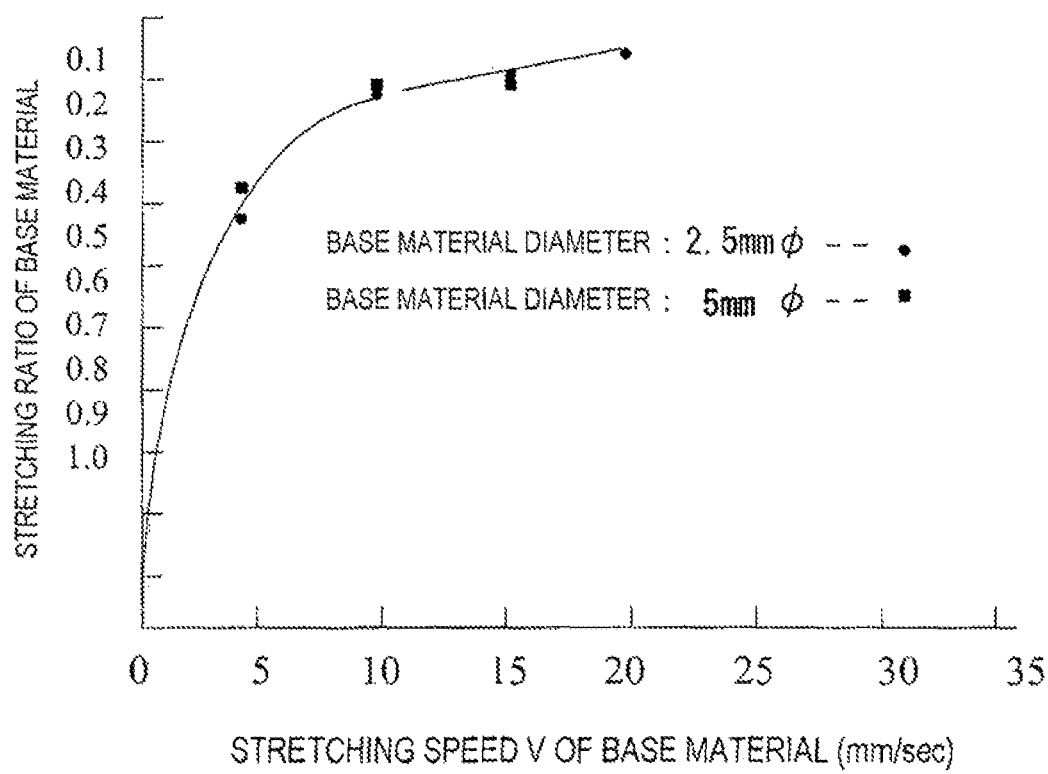
FIG. 28 shows experiment results obtained using the machine of FIG. 27.

FIG. 28 is a graph showing a relation between a stretching speed and a stretching ratio when the quartz glass connector base material 13 is heated and stretched using the machine of FIG. 27 while being rotated at 30 rpm in the radial direction (a direction indicated by an arrow 30 in FIG. 27). The horizontal axis of the graph of FIG. 28 indicates the stretching speed Vi of the base material 13, and the vertical axis thereof indicates the stretching ratio of the base material for 13. Black circles indicate results obtained when the diameter of the base material 13 is 2.5 mm and the inner diameter of the leading end of the acetylene gas burner 26 is 0.5 mm. Black squares indicate results obtained when the diameter of the base material 13 is 5 mm and the inner diameter of the leading end of the acetylene gas burner 26 is 1 mm.

For both the cases, it can be understood that, if the stretching speed is increased, the base material 13 can be stretched such that the stretching ratio thereof is a desired value 0.1, that is, 1/10. Although the graph of FIG. 28 shows results obtained when the base material 13 is rotated at 30 rpm in the radial direction during the heating and stretching, results obtained when the base material 13 is rotated at 20 rpm are also desirable. Meanwhile, if the base material 13 is rotated at 50 rpm, the shape of an optical connector obtained after the stretching is uneven.

Figure 29:
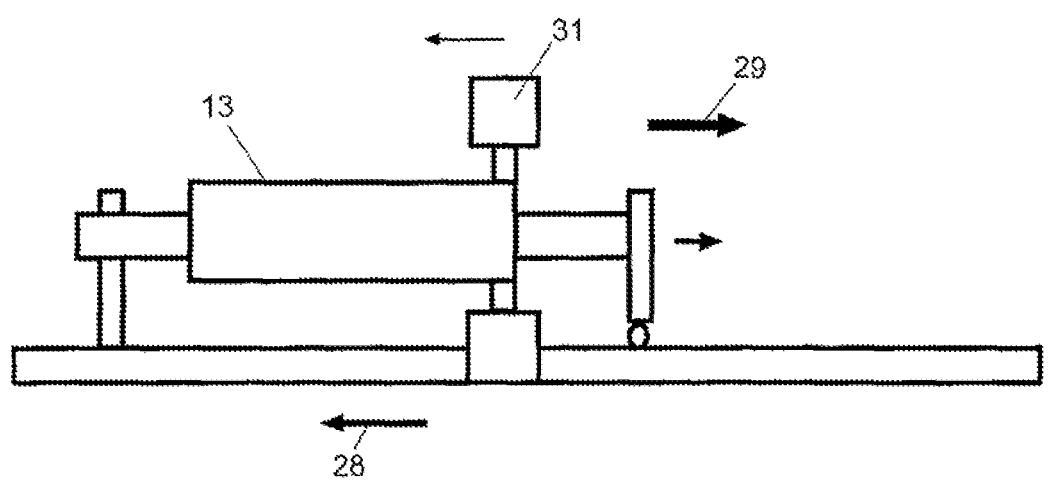
FIG. 29 is a diagram illustrating another machine for stretching the quartz glass connector base material vitrified into transparent glass by heating with arc discharge and reducing its outer diameter etc.,.

FIG. 29 illustrates another machine for heating and stretching the quartz glass connector base material. This machine is a machine for stretching the base material by heating with arc discharge 31.

Eighth Embodiment

Figure 30:
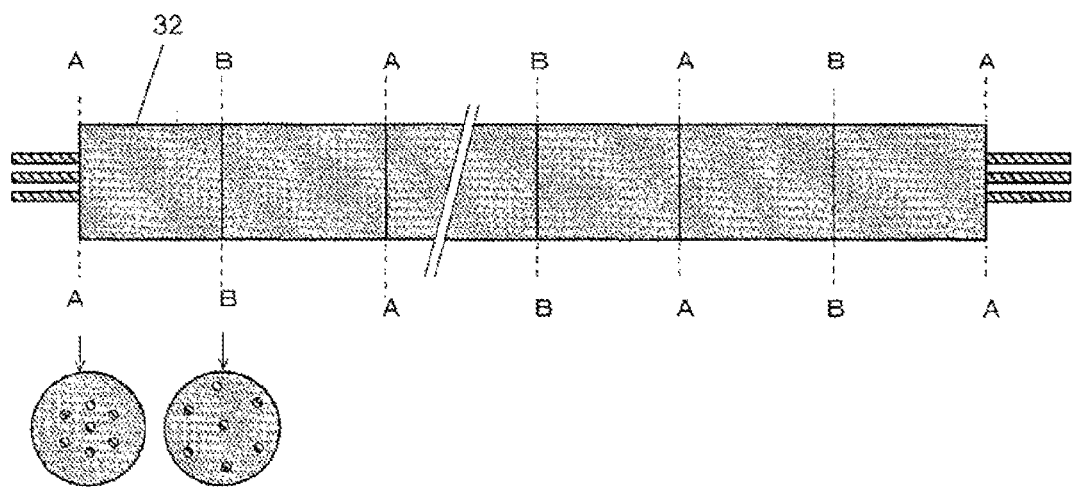
FIG. 30 is a diagram illustrating a porous glass connector base material according to an eighth embodiment of the present invention.

FIG. 30 illustrates an example of a connector base material 32 used to manufacture optical connectors according to the present invention. Specifically, the connector base material 32 is formed by connecting a plurality of the porous glass connector base materials 8 illustrated in FIGS. 3A to 3C in series into one base material having a larger length. Specifically, the connector base material 32 is formed by repeating the following process. That is, it is assumed that one end face (the left end face in FIG. 3A) of the porous glass connector base material 8 is A and that the other end face (in FIG. 3A, the right end face) thereof is B. Then, the end face B of a second porous glass connector base material 8 is connected to the end face B of a first porous glass connector base material 8 such that the plurality of empty holes are communicated with each other, and the end face A of a third porous glass connector base material 8 is connected to the end face A of the second porous glass connector base material such that the plurality of empty holes are communicated with each other.

If the plurality of porous glass connector base materials are arranged in series and are fixed so as to be pushed from both the ends thereof, the connector base materials are fused and connected to each other during heating. Alternatively, series-connected portions of the connector base materials may be heated and fused in advance to each, other by an oxyhydrogen burner. Alternatively, the plurality of porous glass connector base materials may be sequentially inserted into a heat-resistant hollow tube (such as a glassy carbon tube, an alumina tube, and a quartz glass tube), and the heat-resistant hollow lube may be put and heated in a high-temperature electric furnace, whereby the base materials in the hollow tube may be fused to each other.

For the connector base material 32, the quartz fibers 10 may be respectively inserted into the empty holes of each of the plurality of porous glass connector base materials before the base materials are connected to each, other, or the quartz fibers 10 may be inserted after the base materials are connected to each other to be one connector base material 32. Also in this case, if the quartz fibers 10 each having an outer periphery coated with plastic are used, the quartz fibers 10 can be easily respectively inserted into the empty holes of the connector base material 32.

The connector base material 32 formed as described above is heated and becomes a connector base material vitrified into quartz glass. If the obtained base material is heated and stretched in the longitudinal direction, a plurality of connectors are obtained in a connected state, and the connected connectors are then cut into individual connectors, whereby the plurality of connectors can be obtained at a time. If series-connected optical connectors are manufactured by a method including a step of coating the outer periphery of the stretched series-connected optical connectors with a plastic material successively after the heating and stretching step, similarly to the optical fiber drawing, the connectors reinforced with the coating material can be manufactured in large amounts.

Ninth Embodiment

Figure 31:
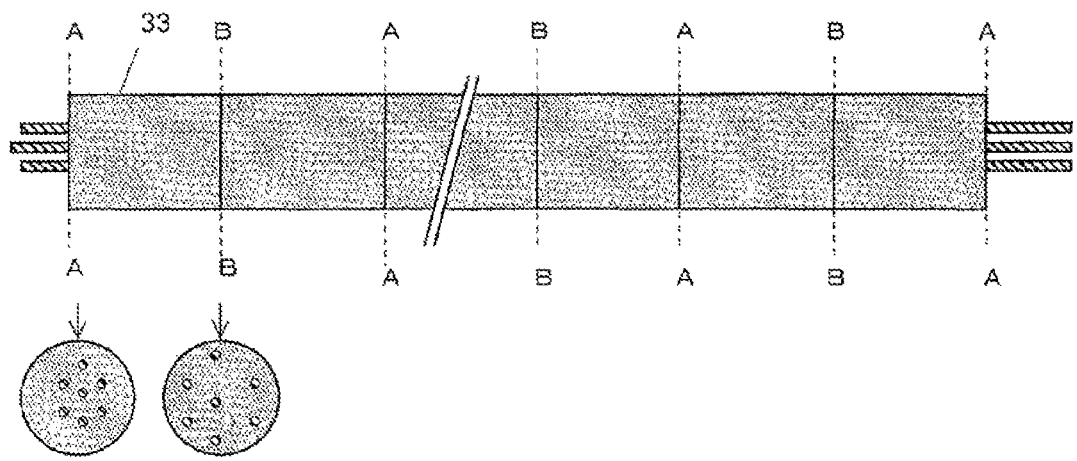
FIG. 31 is a diagram illustrating a quartz glass connector base material according to a ninth embodiment of the present invention.

FIG. 31 illustrates an example of a quartz glass connector base material 33 used to manufacture optical connectors according to the present invention. In the present embodiment, the quartz glass connector base material 33 is obtained by heating the connector base material 32 described in the eighth embodiment. Quartz glass fibers are respectively inserted into the empty holes of the quartz glass connector base material 33. Then, the quartz glass connector base material 33 is heated and stretched in the longitudinal direction. As a result, a plurality of connectors are obtained in a connected state. Also in the present embodiment, the plurality of connected connectors are cut into individual connectors, whereby the plurality of connectors can be obtained at a time.

Figure 32:
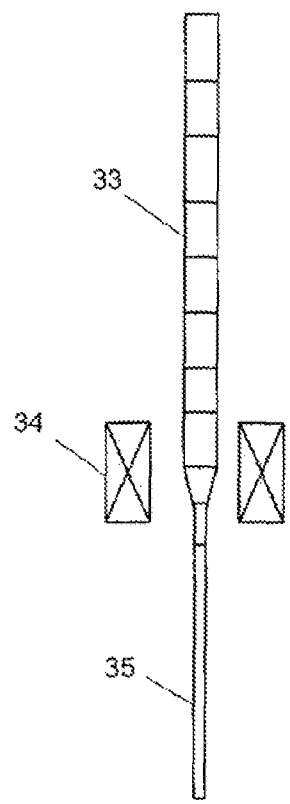
FIG. 32 is a diagram illustrating the state where the quartz glass connector base material is stretched.

FIG. 32 illustrates the state where the quartz glass connector base material 33 described in the seventh embodiment or the eighth embodiment is heated and stretched in a high-temperature electric furnace (a temperature range of 1,850° C. to 2,000° C.) 34 and the plurality of connectors (denoted by reference numeral 35) are obtained in the connected state. That the machine used for the heating and stretching may be the glass lathe machine of FIG. 29. Alternatively, by a vertical zone melting method, the quartz glass connector base material may be stretched while being partially heated, whereby the optical connectors may be manufactured. Also in this case, the outer periphery of the obtained optical connectors may be coated with a coating material.

Note that the present invention is not limited to the above-mentioned embodiments.

Figure 33:
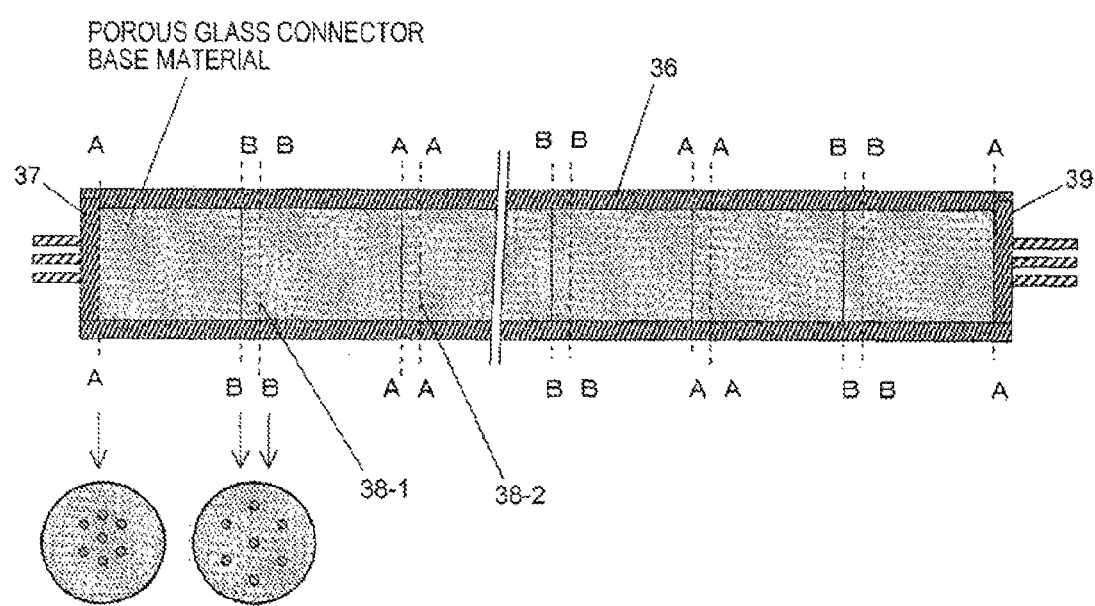
FIG. 33 is a diagram illustrating a porous glass connector base material together with a mold, according to a modification of the present invention.

In the case of manufacturing a porous glass connector base material using a mold container, one base material is manufactured in the embodiments. Alternatively, a large number of (four or more, approximately fifty) base materials for connectors may be manufactured in a connected state. That is, as illustrated in FIG. 33, a fitting 37 having a structure for multi-core fiber connection is provided on one end face of a mold container 36. Then, the following process is sequentially repeated: two thin plastic spacers 38-1 including holes for a structure of bundled single-mode fibers are provided in an extension thereof with a distance; two thin plastic spacers 38-2 including holes for multi-core fiber connection are provided in a further extension thereof with a distance; and two thin plastic spacers 38-1 including holes for a structure of bundled single-mode fibers are provided in a still further extension thereof with a distance. Then, a fitting 39 having a structure for multi-core fiber connection is provided on an end face of the mold container 36 opposite to the fitting 37. In this way, a mold container for manufacturing a large number of base materials for connectors may be manufactured.

Here, the thin plastic spacers including the holes burn out, evaporate, and disappear in the step of heating the base materials for the optical connectors, and hence the use of the thin plastic spacers is very convenient. It is sufficient that the thickness of each spacer be large enough not to cause spacer deformation even if glass fibers are respectively inserted into the holes. Conversely, if the thickness of each, spacer is excessively large, the burn-out material thereof evaporates in the heating step and does not go outside easily. Hence, the thickness of each spacer is preferably approximately 0.5 mm to 3 mm.

Moreover, the spacer distance is preferably within a range of 10 mm to 50 mm. If this distance is set narrower, the distance between the optical connectors should be narrower accordingly. If this distance is set wider, individual optical connectors can be cut out easily. The material usable for the spacers includes acrylic, polystyrene, and polyester that enable processing with high dimension precision. Here, N glass fibers each including a circular rod with a high refractive index and a material with a low refractive index material that surrounds the outer periphery of the circular rod are arranged in the mold container manufactured as described above. In this state, a $SiO_2$ glass raw material solution containing a hardening resin and a hardener is poured into the mold container. The $SiO_2$ glass raw material solution is solidified due to a self-hardening reaction caused by a reaction between the hardening resin and the hardener. Then, the mold container is removed, and the solidified material is dried and degreased, whereby a large number of porous glass connector base materials including the N glass fibers are obtained. Then, the large number of porous glass connector base materials are heated, whereby base materials for connectors vitrified into quartz glass are obtained. Then, the connector base materials vitrified into quartz glass are heated and stretched in the longitudinal direction, whereby optical connectors are manufactured. Further, similarly to the fiber drawing, the large number of optical connector base materials into which the glass fibers are inserted are inserted at a given speed into a high-temperature electric furnace, while the leading end of the melt base materials is stretched. The outer periphery of the stretched optical connectors is coated with a plastic material. As a result, a large number of optical connectors can be obtained in a connected state, and the connected optical connectors may be cut into individual optical connectors. In this way, the optical connectors can be manufactured in large amounts.

Connector Base materials s are manufactured using the mold for manufacturing connected connector base materials in which the fitting having the structure for multi-core fiber connection is provided on the one end face of the mold container. Then, the connector base materials thus manufactured are heated and stretched, whereby a large number of optical connectors are obtained in a connected state. Then, the connected optical connectors are cut into individual optical connectors. In this way, the optical connectors can be manufactured in large amounts.

The glass fibers may be inserted in advance when the connected connector base materials are manufactured, or the glass fibers may be inserted after the solidification. Also in this manufacturing method, a polymer coating material may be formed in the outer periphery of each glass fiber. Also in this case, the polymer coating material burns out and disappears at the time of heating.

The number of cores, the core diameter, the core distance, and the outer diameter of the multi-core fiber are not limited to those in the above-mentioned embodiments. That is, the number of cores maybe approximately two to nineteen, the core diameter may be within a range of 5 μm to 20 μm, the core distance may be about 20 μm to 70 μm, and the outer diameter may be about 100 μm to 300 μm.

Some multi-core fibers have a structure in which a low refractive index layer, an empty hole, or a void is provided between a core and a core. The optical connector of the present invention can also be applied to such multi-core fibers.

In the case of the mode field radii of the multi-core fiber, the single-mode fibers, and the quartz glass fibers are known instead of display the core diameters and the relative refractive index differences thereof, the mode field radius of the quartz glass fibers may be set so as to coincide with the mode field radius of the multi-core fiber.

The core diameter of the single-mode fiber may be 3 μm to 20 μm. The core distance thereof may be 60 μm to 125 μm. The outer diameter thereof may be reduced to approximately 80 μm by chemical etching. In the case of using polarization maintaining fibers instead of the single-mode fibers, polarization maintaining fibers may be used as the glass fibers.

REFERENCE SIGNS LIST

1 . . . Metal Container
2 . . . Mixed Solution
3 . . . Metal Rod
4 . . . Upper Lid
5 . . . Lower Lid
8 . . . Porous Glass Connector Base Material
10 . . . Quartz Fiber
11 . . . Core
13 . . . Quartz Glass Connector Base Material
15 . . . Optical Connector
16 . . . Multi-Core Fiber
17 . . . Single-Mode Fiber
26 . . . Heat Source (Acetylene Gas Burner)

The invention claimed is:

1. An optical connector for connecting: N (N is an integer of 3 to 14) single-mode fibers each comprising one core with a high refractive index in a cladding material with a low refractive index; to a multi-core fiber comprising N cores with high refractive indexes in a cladding material with a low refractive index, wherein a diameter of the core of each of the single-mode fibers is the same as that of the cores of the multi-core fiber, and a diameter of each of the single-mode fibers is larger than a distance between each of the cores of the multi-core fiber, in such a manner that the cores of the single-mode fibers are respectively optically coupled to the cores of the multi-core fiber, the optical connector comprising:
a quartz glass cylinder with a length of at least 1000 mm having a first end face to be in contact with the multi-core fiber and a second end face to be in contact with the single-mode fibers; and
N glass fibers that are arranged in the quartz glass cylinder so as to extend from the first end face to the second end face, the N glass fibers each containing: a circular rod with a high refractive index that has a constant outer diameter which is the same as that of each of the cores of the multi-core fiber and that of the core of each of the single-mode fibers; and a low refractive index material that surrounds an outer periphery of the circular rod and has a constant thickness, wherein
the glass fibers are arranged in the quartz glass cylinder such that: a distance between the circular rods on the first end face is equal to a core distance of the multi-core fiber; and a distance between the circular rods on the second end face is equal to a core distance of adjacent ones of the N single-mode fibers when they are bundled.

2. The optical connector according to claim 1, wherein the quartz glass cylinder includes, on the first end face, a multi-core fiber insertion hole into which the multi-core fiber is to be inserted.

3. The optical connector according to claim 1, wherein the quartz glass cylinder includes, on the second end face, a single-mode fiber insertion hole into which the N single-mode fibers are to be inserted.

4. The optical connector according to claim 1, wherein a relative refractive index difference between the circular rod and the low refractive index material of each glass fiber is equal to or is a value intermediate between: a relative refractive index difference between each core and the cladding material of the multi-core fiber; and a relative refractive index difference between the core and the cladding material of each single-mode fiber.

5. The optical connector according to claim 1, wherein an outer peripheral surface of the quartz glass cylinder is provided with a mark indicating arrangement of a glass fibers.

6. The optical connector according to claim 1, having a length of at least 1,000 mm to 15,000 mm.

* * * * *